United States Patent
Rajagopal et al.

(10) Patent No.: US 9,838,169 B2
(45) Date of Patent: Dec. 5, 2017

(54) METHODS AND APPARATUS USING INTERLEAVED GUARD OFDM IN WIRELESS COMMUNICATION SYSTEMS

(71) Applicant: Samsung Electronics Co., Ltd., Gyeonggi-do (KR)

(72) Inventors: Sridhar Rajagopal, Plano, TX (US); Rakesh Taori, McKinney, TX (US); Sudhir Ramakrishna, Plano, TX (US); Jaspreet Singh, San Jose, CA (US); Shadi Abu-Surra, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 14/823,823

(22) Filed: Aug. 11, 2015

(65) Prior Publication Data
US 2016/0128072 A1    May 5, 2016

Related U.S. Application Data

(60) Provisional application No. 62/072,268, filed on Oct. 29, 2014.

(51) Int. Cl.
*H04W 4/00*    (2009.01)
*H04L 5/00*    (2006.01)
(Continued)

(52) U.S. Cl.
CPC ............ *H04L 5/0007* (2013.01); *H04L 5/001* (2013.01); *H04L 5/0091* (2013.01); *H04L 27/2602* (2013.01); *H04W 72/048* (2013.01)

(58) Field of Classification Search
CPC ... H04L 5/0007; H04L 5/0048; H04L 1/0071; H04L 27/2649; H04L 1/0057;
(Continued)

(56) References Cited

U.S. PATENT DOCUMENTS 6,661,771 B1 * 12/2003 Cupo .................... H04L 1/0071
                                                              370/204
6,956,812 B2 * 10/2005 Okada ................. H04L 27/2662
                                                              370/208
(Continued)

FOREIGN PATENT DOCUMENTS

WO    2005081416 A1    9/2005
WO    2013021187 A1    2/2013

OTHER PUBLICATIONS

International Search Report dated Mar. 31, 2016 in connection with International Application No. PCT/KR2015/011508, 3 pages.
(Continued)

*Primary Examiner* — Michael J Moore, Jr.

(57) ABSTRACT

A user equipment, apparatus, and method are provided for wireless communication using an IG-OFDM structure. An apparatus is configured to transmit a known reference signal. The apparatus is configured to receive, in response to the reference signal and from at least one user equipment (UE), capability information that includes at least one of the sub-band bandwidth or number of independently decodable sub-bands that can be dynamically turned on or off by the at least one UE. The apparatus is configured to define an interleaved guard OFDM (IG-OFDM) structure according to the received capability information, the IG-OFDM structure including guard tones distributed within an OFDM symbol where there is no signal transmission on these guard tones. The apparatus is configured to communicate with the at least one UE using a transmitted waveform that is shaped according to the IG-OFDM structure.

20 Claims, 16 Drawing Sheets

(51) Int. Cl.
*H04L 27/26* (2006.01)
*H04W 72/04* (2009.01)

(58) Field of Classification Search
CPC ............ H04L 27/2602; H04L 27/2626; H04L 27/2613; H04W 84/12; H04W 72/0453; H04W 88/08; H04W 72/04; H04W 24/02
See application file for complete search history.

(56) References Cited

U.S. PATENT DOCUMENTS

| | | | | |
|---|---|---|---|---|
| 7,756,002 | B2 * | 7/2010 | Batra | H04B 1/7163 |
| | | | | 370/208 |
| 7,782,810 | B2 * | 8/2010 | Han | H04L 27/262 |
| | | | | 370/318 |
| 7,830,782 | B2 * | 11/2010 | Shoemake | H04L 1/0041 |
| | | | | 370/208 |
| 8,165,227 | B2 * | 4/2012 | Yun | H04L 27/2601 |
| | | | | 375/244 |
| 9,214,998 | B2 * | 12/2015 | Kenney | H04L 1/00 |
| 9,571,240 | B2 * | 2/2017 | Kim | H04L 1/0065 |
| 2006/0098569 | A1 | 5/2006 | Han et al. | |
| 2009/0232238 | A1 | 9/2009 | Ahmed et al. | |
| 2009/0274035 | A1 * | 11/2009 | Siaud | H04L 1/0071 |
| | | | | 370/208 |
| 2010/0021166 | A1 | 1/2010 | Way | |
| 2010/0086066 | A1 | 4/2010 | Chrabieh et al. | |
| 2010/0246505 | A1 * | 9/2010 | Chong | H04W 72/044 |
| | | | | 370/329 |
| 2011/0091220 | A1 | 4/2011 | Rajagopal et al. | |
| 2013/0208821 | A1 * | 8/2013 | Yang | H04L 1/0071 |
| | | | | 375/295 |
| 2014/0023155 | A1 | 1/2014 | Khoryaev et al. | |

OTHER PUBLICATIONS

Communication from a foreign patent office in a foreign counterpart application, European Patent Office, "Supplementary European Search Report," Application No. EP 15 85 5465, Oct. 13, 2017, 8 pages.

* cited by examiner

METHODS AND APPARATUS USING INTERLEAVED GUARD OFDM IN WIRELESS COMMUNICATION SYSTEMS

CROSS-REFERENCE TO RELATED APPLICATION(S) AND CLAIM OF PRIORITY

The present application claims priority to U.S. Provisional Patent Application Ser. No. 62/072,268, filed Oct. 29, 2014, entitled "INTERLEAVED GUARD OFDM FOR LOW POWER, LARGE BANDWIDTH COMMUNICATION SYSTEMS". The content of the above-identified patent document is incorporated herein by reference.

TECHNICAL FIELD

The present application relates generally to wireless communication systems and, more specifically, to improving performance in low power, large bandwidth communications systems.

BACKGROUND

Orthogonal frequency division multiplexing (OFDM) has been adopted as a standard for various high data rate wireless communication systems due to the spectral bandwidth efficiency, robustness to frequency selective fading channels, etc. However, implementation of the OFDM system entails several difficulties as we explore larger system bandwidths to provide increased data rates for future communication systems. As the data rate and bandwidth of the OFDM system increases, the signal processing complexity increases substantially leading to increased power consumption. Disclosed embodiments address these issues by introducing an interleaved guard OFDM for low power, large bandwidth communication systems.

SUMMARY

Methods and apparatus using interleaved guard OFDM in wireless communication systems are provided.

A first embodiment includes an apparatus, comprising a transceiver including at least a controller. The transceiver is configured to transmit a known reference signal. The transceiver is configured to receive, in response to the reference signal and from at least one user equipment (UE), capability information that includes at least one of the sub-band bandwidth or number of independently decodable sub-bands that can be dynamically turned on or off by the at least one UE. The transceiver is configured to define an interleaved guard OFDM (IG-OFDM) structure according to the received capability information, the IG-OFDM structure including guard tones distributed within an OFDM symbol where there is no signal transmission on these guard tones. The transceiver is configured to communicate with the at least one UE using a transmitted waveform that is shaped according to the IG-OFDM structure. In some cases, the capability information is transmitted using a bitmap of tones for the IG-OFDM structure, where the bit-map indicates locations where the guard or null tones should be inserted, and the IG-OFDM structure includes guard tones or null tones at those locations. In some cases, the apparatus dynamically switches between an IG-OFDM mode and a non-IG-OFDM mode to communicate with the at least one UE according to the IG-OFDM structure in an IG-OFDM service period, and to also communicate with a second UE in a second service period without using an IG-OFDM structure. In some cases, the IG-OFDM structure is communicated in a first portion of a data transmission, and a second portion of the data transmission is formatted according to the IG-OFDM structure. In some cases, the apparatus communicates with at least two different UEs using different respective sub-band bandwidths according to the IG-OFDM structure.

A second embodiment includes a UE for wireless communication with at least one base station comprising a transceiver. The transceiver is configured to communicate with the at least one base station by transmitting capability information to the at least one base station that includes at least one of the sub-band bandwidth or number of independently decodable sub-bands that can be dynamically turned on or off by the at least one UE. The transceiver is configured to thereafter communicate with the base station using a received waveform that is shaped according to an IG-OFDM structure defined at least in part by the capability information. The IG-OFDM structure includes guard tones distributed within an OFDM symbol where there is no signal transmission on these guard tones. In some cases, the capability information is communicated in a first portion of a data transmission, and a second portion of the data transmission is formatted according to the IG-OFDM structure. In some cases, the UE uses the guard tones distributed within an OFDM symbol of the received IG-OFDM waveform to filter at least one of the independently-decodable sub-bands. In some cases, the UE processes multiple independently decodable sub-bands using, for each sub-band, a separate variable gain amplifier (sub-VGA), analog-to-digital converter (sub-ADC), and Fast Fourier Transform (sub-FFT) processor. In some cases, the UE dynamically turns off sub-processing paths for sub-bands that do not correspond to that UE. In some cases, the UE receives and processes data on one of a plurality of independently-decodable sub-bands associated with the UE using at least one sub-analog-to-digital converter (sub-ADC), and turns off at least one other sub-analog-to-digital converter corresponding to an independently-decodable sub-band not associated with the UE.

A third embodiment includes a method for wireless communication by an apparatus having at least a transceiver that includes at least a controller. The method includes communicating with at least one base station by transmitting capability information to the at least one base station that includes at least one of the sub-band bandwidth or number of independently decodable sub-bands that can be dynamically turned on or off by the at least one UE. The method includes thereafter communicating with the base station using a received waveform that is shaped according to an IG-OFDM structure defined at least in part by the capability information. The IG-OFDM structure including guard tones distributed within an OFDM symbol where there is no signal transmission on these guard tones. In some cases, the capability information includes a bitmap of tones for the IG-OFDM structure, wherein the bit-map indicates locations where the guard tones or null tones should be inserted, and the IG-OFDM structure includes the guard tones or the null tones at those locations. The method can also include filtering at least one of the independently-decodable sub-bands using the guard tones distributed within an OFDM symbol of the received waveform. The method can also include receiving and processing data on one of a plurality of independently-decodable sub-bands associated with the apparatus using at least one sub-analog-to-digital converter (sub-ADC), and turning off at least one other sub-analog-to-digital converter corresponding to an independently-decodable sub-band not associated with the apparatus. In some cases, wherein the capability information is transmitted in a first portion of a data transmission, and the second portion of the data transmission is formatted according to the IG-OFDM structure. In some cases, the at least one base station communicates with at least two different UEs using different respective sub-band bandwidths according to the IG-OFDM structure. The method can also include processing multiple independently decodable sub-bands using, for each sub-band, a separate variable gain amplifier (sub-VGA), analog-to-digital converter (sub-ADC), and Fast Fourier Transform (sub-FFT) processor. The method can also include dynamically turning off sub-processing paths for sub-bands that do not correspond to that apparatus. In some cases, the guard tones are distributed within an OFDM symbol at specific locations to reduce interference between sub-bands.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method.

Disclosed embodiments include an OFDM communication system for large bandwidths that eliminates aggregation circuitry leakage at the transmitter and supports low power operation at the receiver. Disclosed embodiments include an interleaved guard OFDM (IG-OFDM) structure that interleaves (distributes) the guard or null tones within the OFDM symbol. There is no signal transmitted on these tones. The total useful spectrum for data transmission using IG-OFDM can still kept constant compared to a conventional OFDM system for an equivalent bandwidth of communication. The IG-OFDM system can fall back to a regular OFDM system dynamically as needed for backward compatibility. Disclosed embodiments provide greater performance with less interference, particularly in low power, large bandwidth communications systems.

Disclosed embodiments include a new OFDM structure where the guard tones are distributed within the OFDM symbol. This enables the use of sub-ADCs at the receiver with lower sampling frequencies as each sub-band, defined by the guard tones, can be processed independently and unused sub-bands can be switched off dynamically resulting in power saving. This also simplifies the transmitter when compared to similar functionality obtained by the traditional architectures for providing large bandwidth communications, in that it eliminates the need for an apparatus to aggregate and eliminates the leakage that may occur due to harmonic copies of the adjacent channels folding back in to the current channel of interest.

Figure 1:
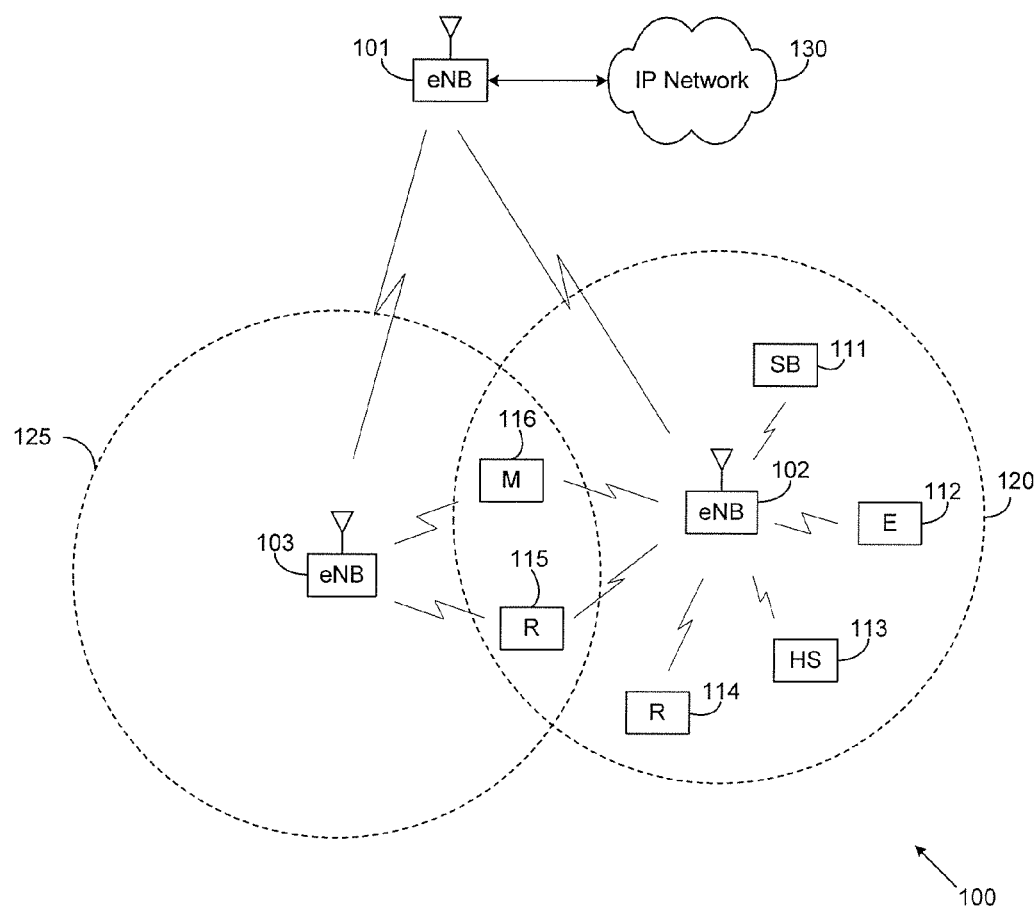
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point" or "AP". For the sake of convenience, the terms "eNodeB," "eNB" and "base station" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," "user device," or similar terms to refer to such an apparatus For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
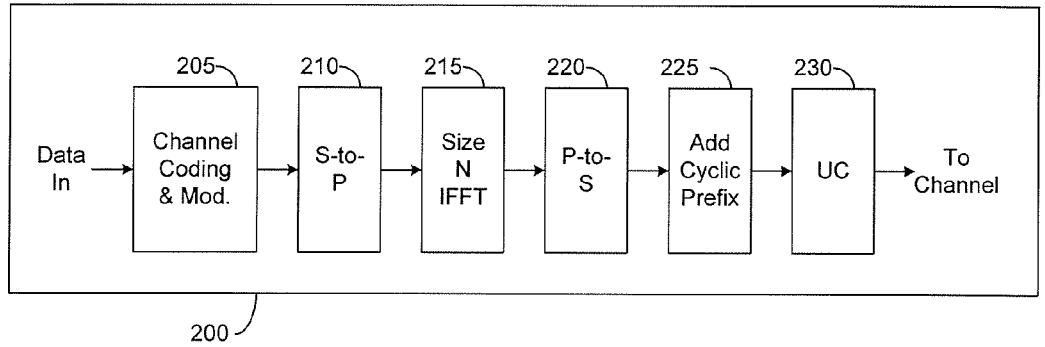
FIGS. 2A and 2B illustrate example wireless transmit and receive paths according to this disclosure.
Figure 2B:
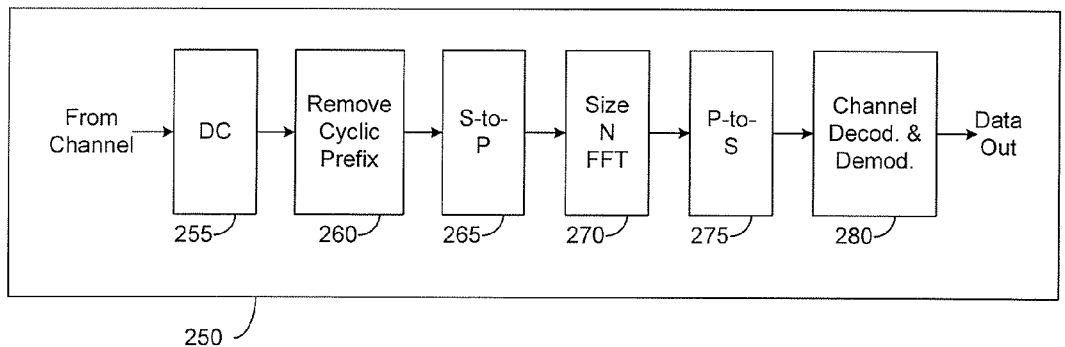

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured communicate using IG-OFDM techniques as described herein.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation. One or more hardware controllers can be used to implement each or multiple ones of the components illustrated in these figures.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architecture could be used to support wireless communications in a wireless network.

Figure 3:
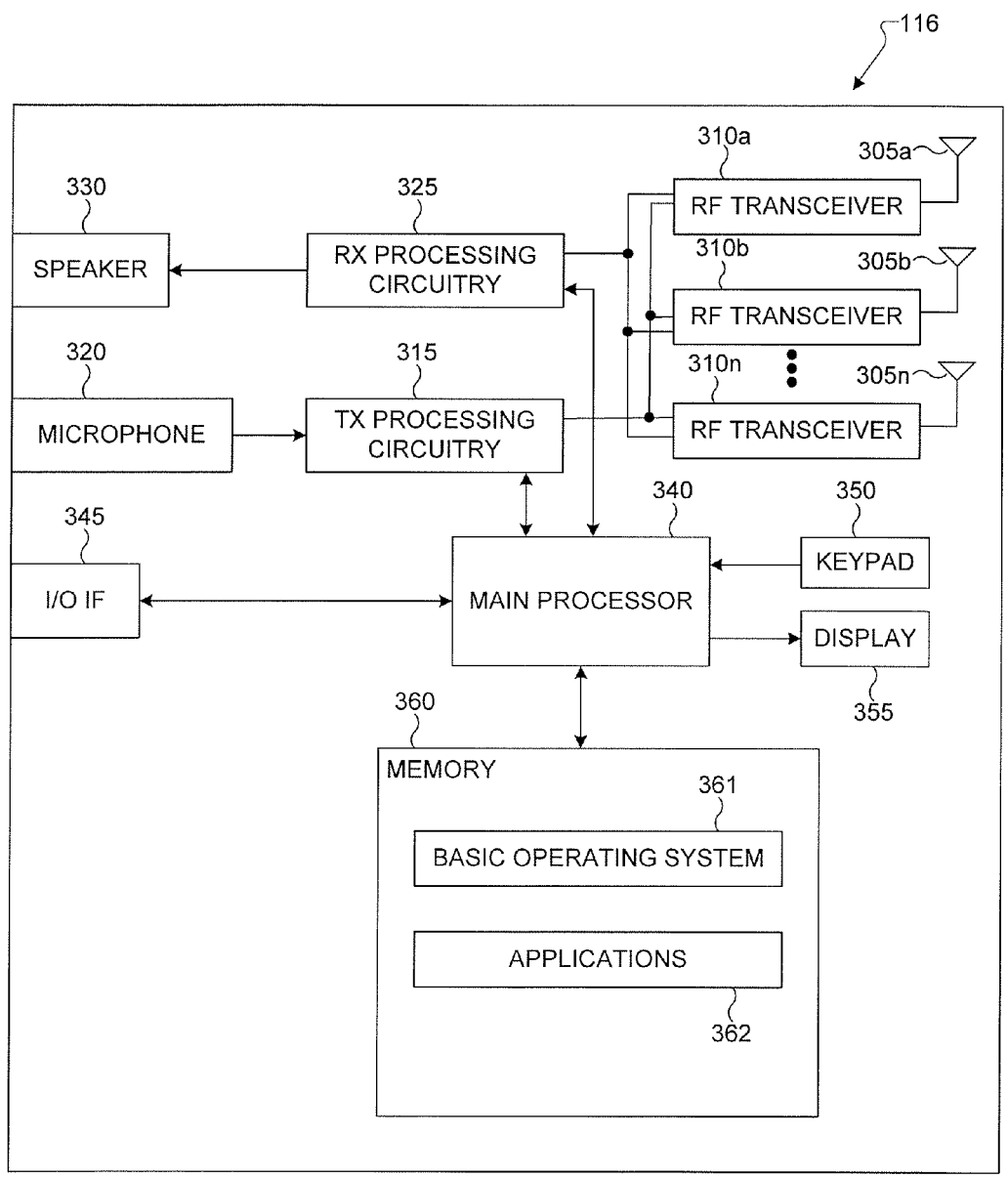
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1A could have the same or similar configuration. However, UEs come in a wide variety of configurations, and FIG. 3 does not limit the scope of this disclosure to any particular implementation of a UE.

The UE 116 includes multiple antennas 305*a*-305*n*, radio frequency (RF) transceivers 310*a*-310*n*, transmit (TX) processing circuitry 315, a microphone 320, and receive (RX) processing circuitry 325. The TX processing circuitry 315 and RX processing circuitry 325 are respectively coupled to each of the RF transceivers 310*a*-310*n*, for example, coupled to RF transceiver 310*a*, RF transceiver 210*b* through to a Nth RF transceiver 310*n*, which are coupled respectively to antenna 305*a*, antenna 305*b* and an Nth antenna 305*n*. In certain embodiments, the UE 116 includes a single antenna 305*a* and a single RF transceiver 310*a*. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceivers 310*a*-310*n* receive, from respective antennas 305*a*-305*n*, an incoming RF signal transmitted by an eNB or AP of the network 100. In certain embodiments, each of the RF transceivers 310*a*-310*n* and respective antennas 305*a*-305*n* is configured for a particular frequency band or technological type. For example, a first RF transceiver 310*a* and antenna 305*a* can be configured to communicate via a near-field communication, such as BLUETOOTH®, while a second RF transceiver 310*b* and antenna 305*b* can be configured to communicate via a IEEE 802.11 communication, such as Wi-Fi, and another RF transceiver 310*n* and antenna 305*n* can be configured to communicate via cellular communication, such as 3G, 4G, 5G, LTE, LTE-A, or WiMAX. In certain embodiments, one or more of the RF transceivers 310*a*-310*n* and respective antennas 305*a*-305*n* is configured for a particular frequency band or same technological type. The RF transceivers 310*a*-310*n* down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceivers 310*a*-310*n* receive the outgoing processed baseband or IF signal from the TX processing circuitry 315 and up-converts the baseband or IF signal to an RF signal that is transmitted via one or more of the antennas 305*a*-305*n*.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceivers 310*a*-310*n*, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for insert general description of at least one aspect of invention. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The user of the UE 116 can use the keypad 350 to enter data into the UE 116. The display 355 can be a liquid crystal display or other display capable of rendering text or at least limited graphics, such as from web sites, or a combination thereof.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
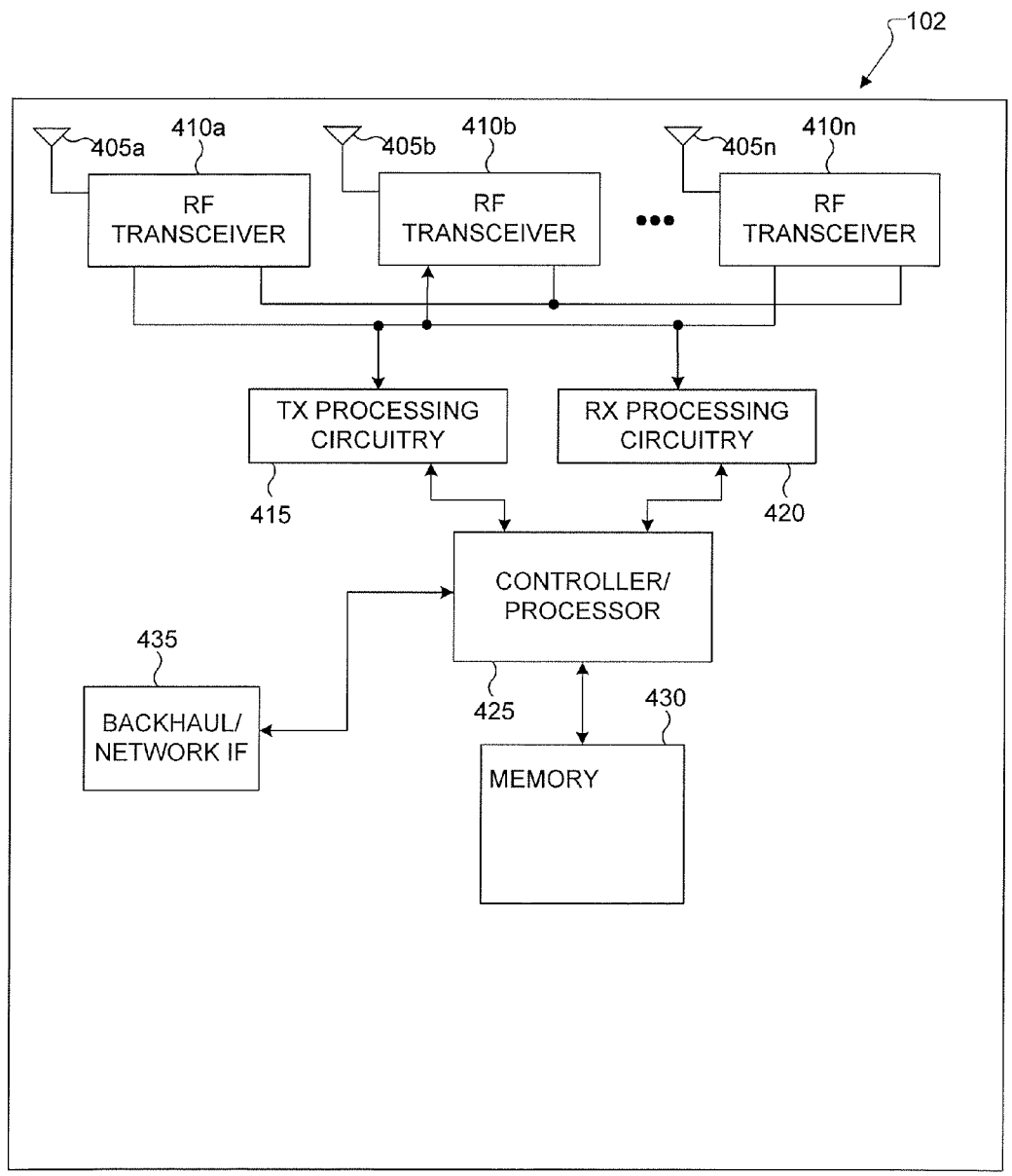
FIG. 4 illustrates an example eNB according to this disclosure.

FIG. 4 illustrates an example eNB 102 according to this disclosure. The embodiment of the eNB 102 shown in FIG. 4 is for illustration only, and other eNBs of FIG. 1 could have the same or similar configuration. However, eNBs come in a wide variety of configurations, and FIG. 4 does not limit the scope of this disclosure to any particular implementation of an eNB.

As shown in FIG. 4, the eNB 102 includes multiple antennas 405a-405n, multiple RF transceivers 410a-410n, transmit (TX) processing circuitry 415, and receive (RX) processing circuitry 420. The eNB 102 also includes a controller/processor 425, a memory 430, and a backhaul or network interface 435.

The RF transceivers 410a-410n receive, from the antennas 405a-405n, incoming RF signals, such as signals transmitted by UEs or other eNBs. The RF transceivers 410a-410n down-convert the incoming RF signals to generate IF or baseband signals. The IF or baseband signals are sent to the RX processing circuitry 420, which generates processed baseband signals by filtering, decoding, and/or digitizing the baseband or IF signals. The RX processing circuitry 420 transmits the processed baseband signals to the controller/processor 425 for further processing.

The TX processing circuitry 415 receives analog or digital data (such as voice data, web data, e-mail, or interactive video game data) from the controller/processor 425. The TX processing circuitry 415 encodes, multiplexes, and/or digitizes the outgoing baseband data to generate processed baseband or IF signals. The RF transceivers 410a-410n receive the outgoing processed baseband or IF signals from the TX processing circuitry 415 and up-converts the baseband or IF signals to RF signals that are transmitted via the antennas 405a-405n.

The controller/processor 425 can include one or more processors or other processing devices that control the overall operation of the eNB 102. For example, the controller/processor 425 could control the reception of forward channel signals and the transmission of reverse channel signals by the RF transceivers 410a-410n, the RX processing circuitry 420, and the TX processing circuitry 415 in accordance with well-known principles. The controller/processor 425 could support additional functions as well, such as more advanced wireless communication functions. For instance, the controller/processor 425 could support beam forming or directional routing operations in which outgoing signals from multiple antennas 405a-405n are weighted differently to effectively steer the outgoing signals in a desired direction. Any of a wide variety of other functions could be supported in the eNB 102 by the controller/processor 425. In some embodiments, the controller/processor 425 includes at least one microprocessor or microcontroller.

The controller/processor 425 is also capable of executing programs and other processes resident in the memory 430, such as a basic OS. The controller/processor 425 can move data into or out of the memory 430 as required by an executing process.

The controller/processor 425 is also coupled to the backhaul or network interface 435. The backhaul or network interface 435 allows the eNB 102 to communicate with other devices or systems over a backhaul connection or over a network. The interface 435 could support communications over any suitable wired or wireless connection(s). For example, when the eNB 102 is implemented as part of a cellular communication system (such as one supporting 5G, LTE, or LTE-A), the interface 435 could allow the eNB 102 to communicate with other eNBs over a wired or wireless backhaul connection. When the eNB 102 is implemented as an access point, the interface 435 could allow the eNB 102 to communicate over a wired or wireless local area network or over a wired or wireless connection to a larger network (such as the Internet). The interface 435 includes any suitable structure supporting communications over a wired or wireless connection, such as an Ethernet or RF transceiver.

The memory 430 is coupled to the controller/processor 425. Part of the memory 430 could include a RAM, and another part of the memory 430 could include a Flash memory or other ROM.

As described in more detail below, the transmit and receive paths of the eNB 102 (implemented using the RF transceivers 410a-410n, TX processing circuitry 415, and/or RX processing circuitry 420) support communication with aggregation of FDD cells and TDD cells.

Although FIG. 4 illustrates one example of an eNB 102, various changes may be made to FIG. 4. For example, the eNB 102 could include any number of each component shown in FIG. 4. As a particular example, an access point could include a number of interfaces 435, and the controller/processor 425 could support routing functions to route data between different network addresses. As another particular example, while shown as including a single instance of TX processing circuitry 415 and a single instance of RX processing circuitry 420, the eNB 102 could include multiple instances of each (such as one per RF transceiver).

Figure 5:
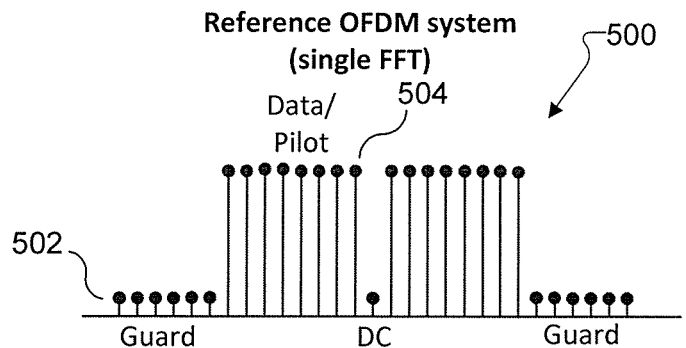
FIG. 5 illustrates a tone structure in a reference OFDM system with a single FFT in accordance with an embodiment of this disclosure.

FIG. 5 illustrates a tone structure 500 in a reference OFDM system with a single FFT. Null/guard tones 502 are inserted at DC and at the edges of the system, adjacent to data/pilot tones 504. The null tone at DC is applied for DC receivers where the center carrier may have a strong DC offset. The guard subcarriers or tones 502 are used to prevent interference from one band into the adjacent band. As the channel bandwidth increases, the ADC bandwidth increases. The FFT size also increases assuming sub-carrier spacing is kept constant.

Some wireless systems, such as IEEE 802.11ad, provide large bandwidths (several GHz) for communication, which must be implemented in an efficient manner for low power consumption. One method of increasing the channel bandwidth is by channel bonding. In this case, the spectrum belonging to two adjacent channels is bonded into a single wider band channel. The FFT size is increased appropriately; typically, the relative increase in the FFT size is proportional to the relative increase in bandwidth. For example, the IEEE 802.11n specification describes channel bonding mechanisms that allows the bandwidth to grow from 20 MHz to 40 MHz by changing the FFT size from 64 to 128, while keeping the same subcarrier spacing of 312.5 KHz.

Figure 6:
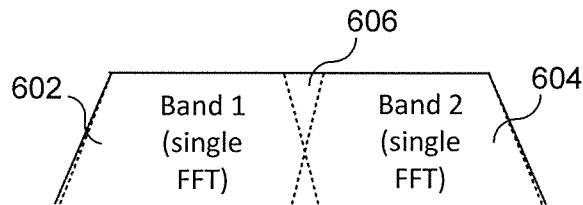
FIG. 6 illustrates an example of channel bonding with a single FFT in accordance with an embodiment of this disclosure.

FIG. 6 illustrates an example of channel bonding with a single FFT. In this figure, Band 1 602 is bonded with Band 2 604 to produce a bonded channel 606 with twice the bandwidth of either of the individual bands.

One alternative to the channel bonding mechanism described above is the carrier aggregation, as implemented in LTE-A, for example. In this case, multiple bands are used simultaneously with independent data streams and control signaling for each band. The bands can be contiguous or non-contiguous. Multiple FFTs are required with this option, one for each sub-band. Typically, the FFTs remain as they are in the original single-band operation.

Figures 7A, 7B:
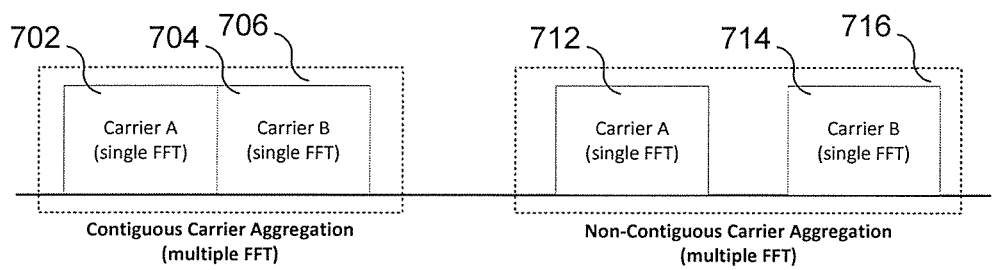
FIGS. 7A and 7B illustrate examples of carrier aggregation in an LTE-A system, using multiple FFTs in accordance with an embodiment of this disclosure.

FIGS. 7A and 7B illustrate examples of carrier aggregation in an LTE-A system, using multiple FFTs. FIG. 7A illustrates contiguous carrier aggregation using multiple FFTs. In this example, carrier A 702, with its single FFT, is aggregated with the next, contiguous carrier B 704, with its own single FFT, to produce the aggregate carrier 706 (which uses multiple FFTs).

FIG. 7B illustrates non-contiguous carrier aggregation using multiple FFTs. In this example, carrier A 712, with its single FFT, is aggregated with non-contiguous carrier B 714, with its own single FFT, to produce the aggregate carrier 716 (which uses multiple FFTs).

Other systems can use an analog multi-tone approach where multiple FFTs are used for different sub-bands, such as in the case of LTE carrier-aggregation, but the separation between the sub-bands is kept small. Inevitably, this results in interference, which is cancelled at the receiver using interference estimation and cancellation techniques.

Figure 8:
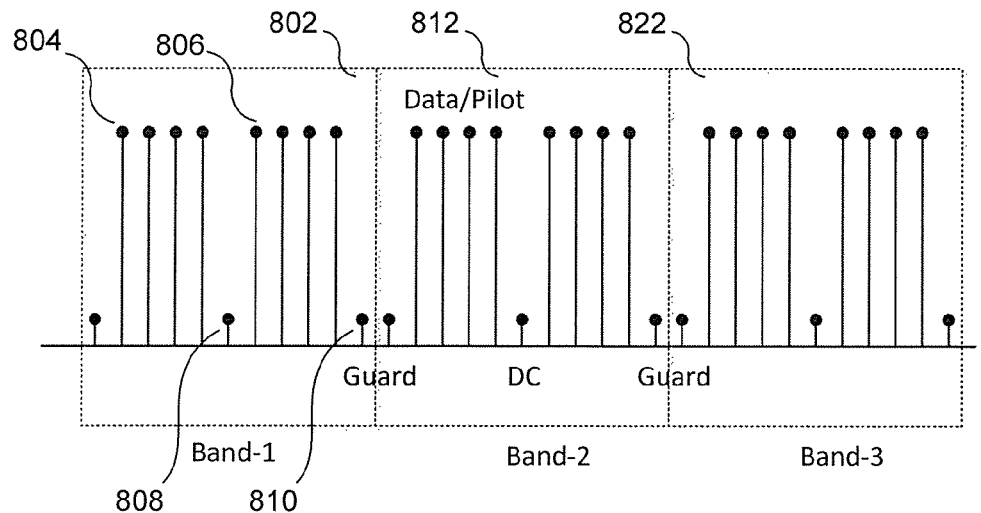
FIG. 8 illustrates an analog multi-tone approach with combined sub-bands and multiple FFTs in accordance with an embodiment of this disclosure.

FIG. 8 illustrates an analog multi-tone approach with combined sub-bands and multiple FFTs. This example illustrates three bands, including Band-1 802, Band-2 812, and Band-3 822. Each band has multiple sub-bands of data/pilot signals, for example as illustrated as sub-band 804 and sub-band 806, and each sub-band has a respective FFT. The sub-bands are generally separated by a DC signal as illustrated by DC signal 808. The bands are separated by guard tones as illustrated by guard tones 810.

An advantage of such an analog multi-tone approach is overhead reduction by minimizing the guard bands. A disadvantage of the analog multi-tone approach is that the aggregation of bands does not work well at the transmitter since there is no possibility of correcting the harmonic leakages or sub-band interference in the digital domain (as can be done in the receiver) and these can be very challenging to undo at the receiver in the presence of noise and other impairments.

Multi-band OFDM uses a structure similar to the analog multi-tone shown in FIG. 8 except that it uses a single FFT, corresponding to a single band, and hops among the multiple bands.

Disclosed embodiments consider communication between devices for large bandwidth systems, where one of them may be an access point (AP), a base-station (BS), and eNB, or UE. A person skilled in the art can understand that the AP, BS, eNB, or UE can be another device, and the techniques described or claimed herein can be applied to it without any loss of generality.

Disclosed embodiments include an interleaved guard OFDM (IG-OFDM) structure that interleaves (distributes) the guard or null tones within the OFDM symbol. There is no signal transmitted on these tones. The total useful spectrum for data transmission using IG-OFDM can still kept constant compared to a conventional OFDM system for an equivalent bandwidth of communication. The IG-OFDM system can fall back to a regular OFDM system dynamically as needed for backward compatibility.

As systems evolve to larger bandwidths (of the order of few GHz to 10s of GHz), ADC architectures using sub-band ADCs are much more efficient from a power consumption and bandwidth scaling point of view. Sub-ADC architectures are also useful to allow gain adjustment on a sub-band basis in the analog domain, reducing the ADC bit-width requirements. In addition, sub-ADCs can also reduce in-band low bandwidth interference by processing them on a separate sub-ADC. For systems that use sub-ADCs, the interleaving of the guard tones is done in a manner to align with the bandwidth of the receiver sub-ADCs. This interleaving of the guard tones reduces the interference between the adjacent sub-bands for receivers that use sub-band ADC processing.

Disclosed embodiments also allow for dynamic power savings when IG-OFDM is used in an OFDMA manner as the entire sub-ADC processing for other users can be turned off to save power. This feature is limited in the current OFDMA receiver implementations where the processing up to the FFT needs to be performed at full bandwidth leading to increased power consumption. By keeping a single FFT structure at the transmitter, the analog aggregation and leakage issues can also be eliminated.

Multiple sub-FFTs followed by aggregation, as used in the analog multi-tone approach described above, suffers from the leakage issues and these damages, once incurred, are very challenging to undo.

By contrast, according to disclosed embodiments, the IG-OFDM receiver itself can use multiple FFTs and any necessary corrections can be applied in the digital domain. Thus, one significant advantage of disclosed embodiments is that aggregation and leakage circuitry at the transmitter can be completely eliminated while the receiver can use multiple sub-FFTs as needed for power savings.

Figure 9:
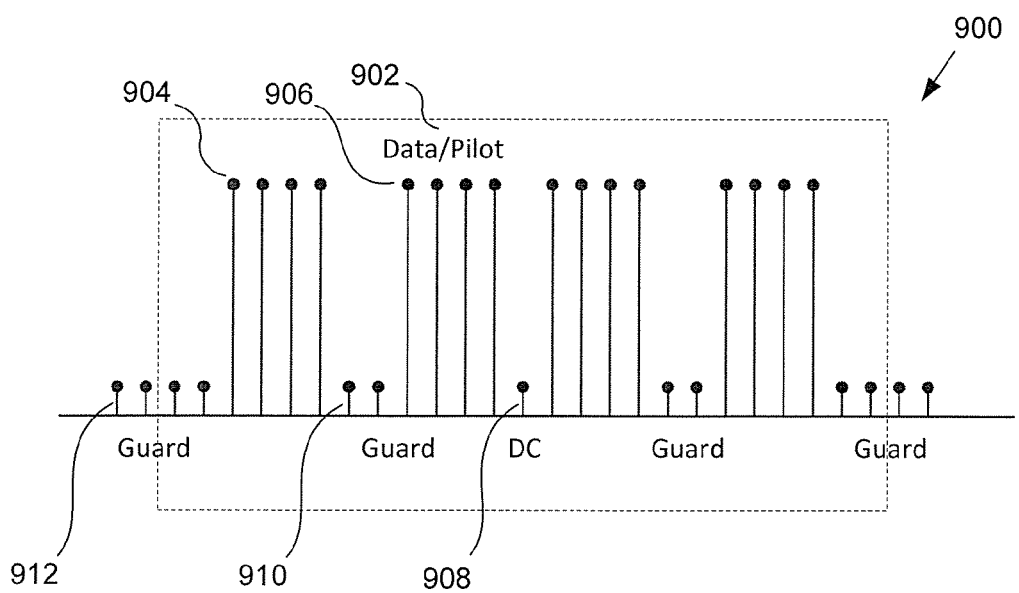
FIG. 9 illustrates one embodiment of an interleaved guard OFDM structure as disclosed herein, using a single FFM.

FIG. 9 illustrates one embodiment of an interleaved guard OFDM structure 900 as disclosed herein, using a single FFM. The guard tones are placed depending on the bandwidth for each sub-band. A guard tone may also be added to support DC in the new sub-band.

This example illustrates a single band 902 with a significantly increased bandwidth as compared to other systems. Each band has multiple sub-bands of data/pilot signals, for example as illustrated as sub-band 904 and sub-band 906, and a single FFT is used across the sub-bands. The sub-bands are either separated by a DC signal as illustrated by DC signal 908 or are separated by interleaved guard tones 910. The bands are separated by inter-band guard tones as illustrated by inter-band guard tones 912. Note, in this example, that there are more inter-band guard tones 912 as compared to interleaved guard tones 910. Interleaved guard tones 910 enable low-power sub-band receivers. A UE can use at least one sub-ADC to communicate with the eNB according to the sub-band bandwidth, and can turn off at least one other sub-ADC that does not correspond to the sub-band bandwidth for that UE.

Table 1 compares a disclosed interleaved guard OFDM structure with other technologies. A total of bandwidth of M GHz for data transmission, with K sub-bands, is assumed in the comparison in Table 1. Table 1 shows that the disclosed interleaved guard OFDM structure is unique in providing wide bandwidth with a single FFT and interleaving guard/null tones within the OFDM symbol. Disclosed embodiments also allow multiple implementations for the receiver, either with a single wide-band FFT or with multiple sub-FFTs.

TABLE 1

| Methods | FFT (single/multiple) | FFT bandwidth | Guard |
|---|---|---|---|
| Default | Single | M | At edge only |
| Channel bonding | Single | M | At edge only |
| Carrier aggregation | K | M/K | In between bands |
| Analog multi-tone | K | M/K | In between bands |
| Multi-band OFDM | Single | M/K (hopping among K) | At edge only |
| Interleaved Guard OFDM | Single (Tx) Single (Rx) or Multiple (K Rx) | M (at Tx) M (at Rx) or M/K (at Rx) | In between bands/sub-bands |

Figure 10:
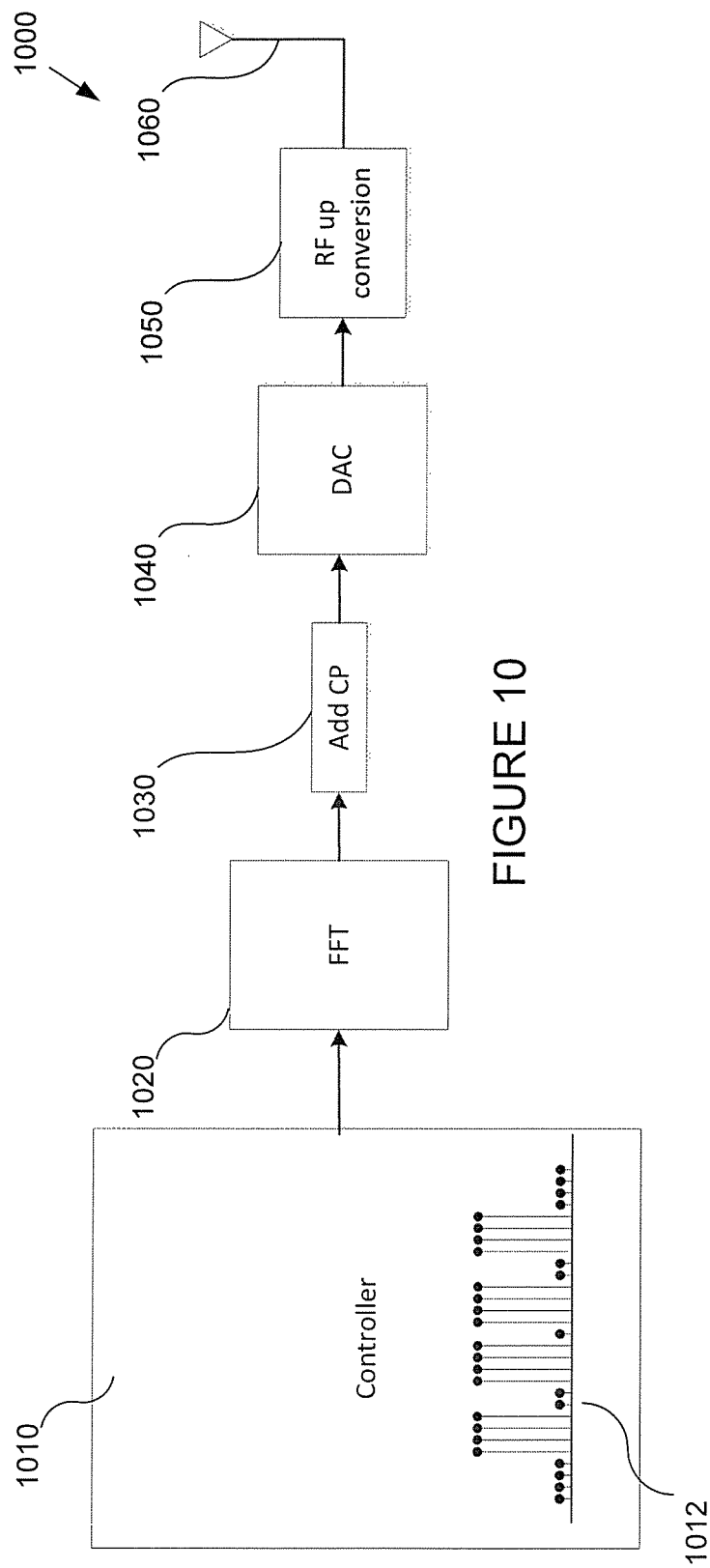
FIG. 10 shows the architecture of an example interleaved guard OFDM transmitter in accordance with disclosed embodiments.

FIG. 10 shows the architecture of an example interleaved guard OFDM transmitter 1000 in accordance with disclosed embodiments. This example OFDM transmitter includes a controller 1010 that can customize an interleaved guard structure 1012 as described herein for communicating with UEs and other devices. Interleaved guard structure has guard tones interleaved within the transmitted sub-bands, for example according to the capabilities of the receiver. The controller 1010 can dynamically place the guard tones within the OFTM signal as required for any device to which it is transmitting, as described herein. Controller 1010 can add additional DC tones as necessary, and can selectively add null or DC tones at spur locations that may be identified by a receiving device.

The interleaved guard structure is used to transmit the output signal as illustrated at 1010 (corresponding to the interleaved guard structure 900). A FFT is performed on the output signal 1010 at 1020, such as by a controller of the transmitter. A cyclic prefix (CP) is added at 1030, such as by a controller of the transmitter. Digital-to-analog conversion is performed at 1040, such as by a digital-to-analog converter (DAC) of the transmitter. RF up-conversion is performed at 1050, such as by an RF converter of the transmitted, and the signal is transmitted at 1060.

Note that while various receivers and transmitters are described separately herein, these will typically be combined into a transceiver of an eNB, UE, or other device, and the processes, operations, or structures of receivers or transmitters described herein are intended to include transceivers.

Figure 11:
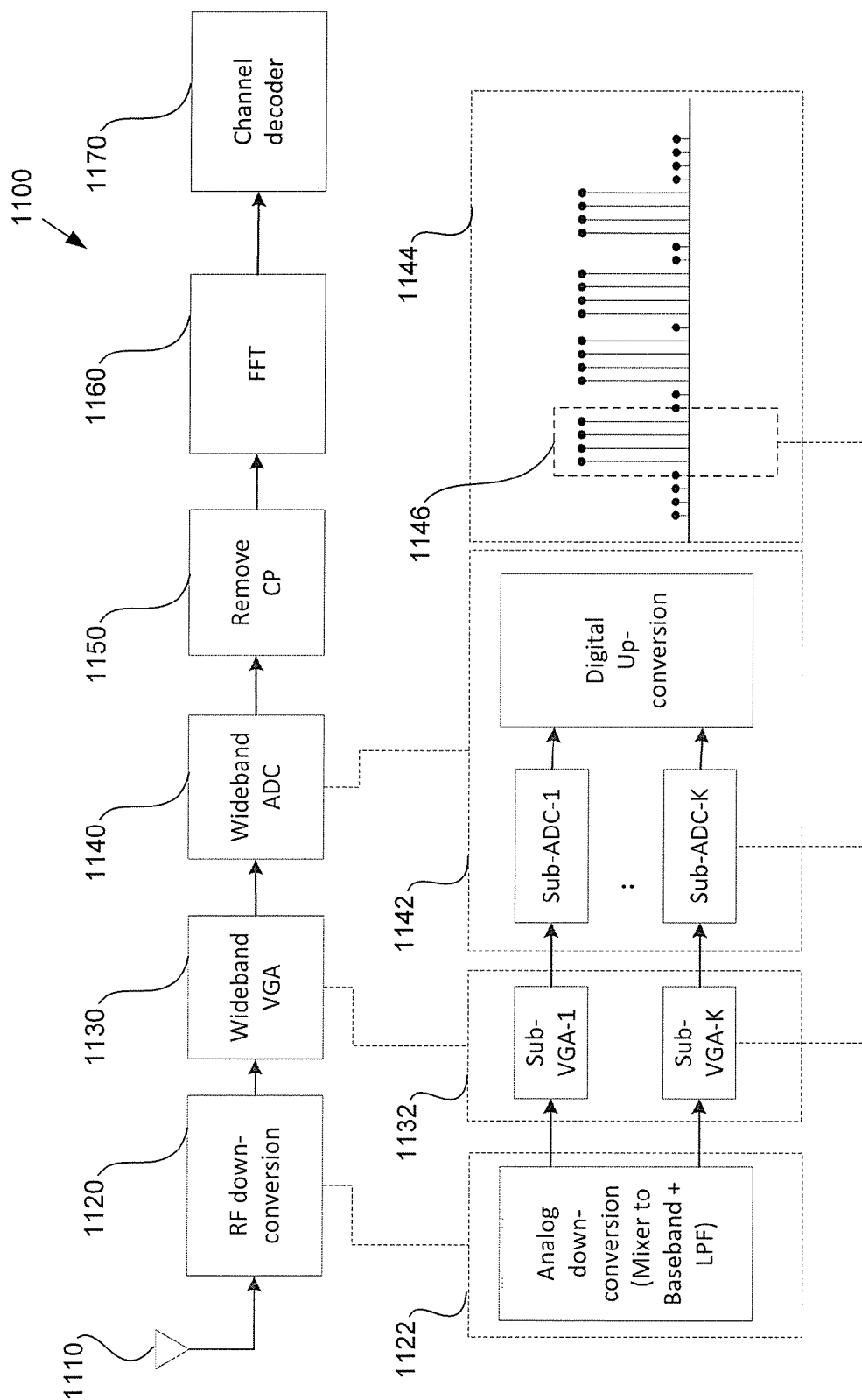
FIG. 11 shows the architecture of an example interleaved guard OFDM receiver architecture 1100 for a single FFT in accordance with disclosed embodiments.

FIG. 11 shows the architecture of an example interleaved guard OFDM receiver architecture 1100 for a single FFT in accordance with disclosed embodiments. FIG. 11 illustrates a receiver operation using interleaved guard OFDM and sub-ADC processing. The wideband analog signal is received at 1110 and is down converted into multiple sub-bands at 1120, such as by an RF down-converter of the transmitter. This down conversion to baseband may be achieved, for example, by using mixers with multiple local oscillator (LO) frequencies followed by low pass filters (LPF) that filter out the harmonics and images to extract sub-bands as illustrated at 1122. Due to non-ideal mixers and filters, there may be interference between the sub-bands during the up-conversion and down-conversion process at the receiver. This is where the interleaved guard tones as disclosed herein are placed in order to mitigate the interference at those transition regions.

The down-converted signal is passed through a wideband variable-gain amplifier (VGA) at 1130. As part of this process, each sub-band can be sent through an independent sub-VGA as illustrated at 1132. Each of the sub-bands 1146 of the interleaved-guard-tone band 1144 can be processed by a separate sub-VGA and sub-ADC.

The output of the wideband VGA is passed through a wideband ADC at 1140. As part of this process, each sub-band can sent through an independent sub-ADC and the outputs of each sub-ADC up-converted back to the digital domain, as illustrated at 1142. The output of the sub-ADC is finally up converted back in the digital domain. Each sub-ADC can have its own sub-VGA as shown at 1132. This allows each sub-ADC to have different gain compensation to combat frequency selective fading (or in-band low bandwidth interference, for example) and can thus reduce ADC bit-width requirements as well.

After conversion back to the digital domain, the receiver removes the CP from the signal at 1150, and the signal is fed into the FFT at 1160. Finally, the converted signal is passed to a channel decoder at 1170.

Figure 12:
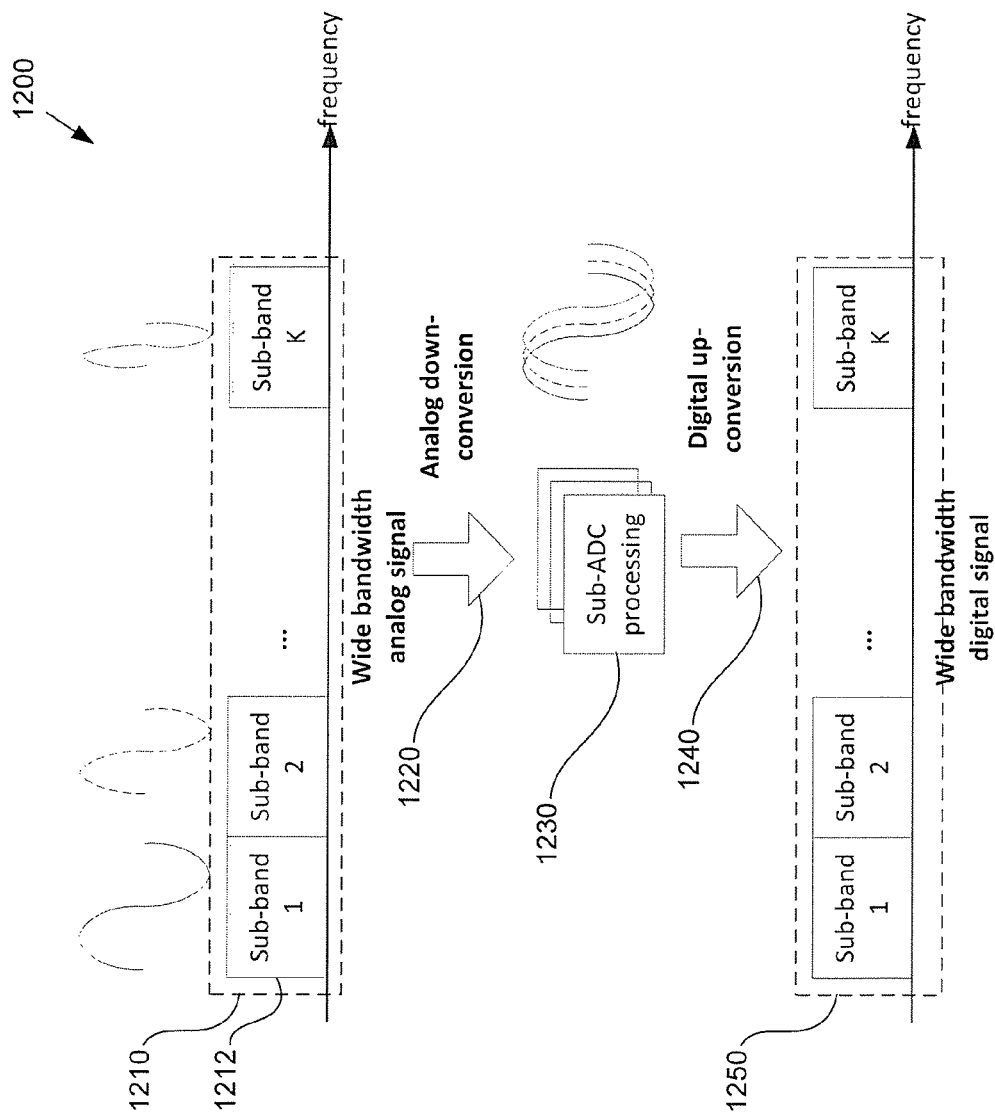
FIG. 12 illustrates a method of sub-band ADC processing for a wideband OFDM analog signal with multiple sub-bands that can be performed by a receiver or transceiver as disclosed herein in accordance with an embodiment of this disclosure.

FIG. 12 illustrates a method of sub-band ADC processing for a wideband OFDM analog signal 1210 with multiple sub-bands 1212 that can be performed by a receiver or transceiver as disclosed herein. The higher frequency contents are down converted at 1220 to a lower frequency baseband. The each sub-band of the lower-frequency baseband is sampled with the sub-ADCs at 1230 and then are up converted back to the digital domain at 1240. This produces the wideband digital signal 1250 before it is sent to the FFT block as described herein.

Figure 13:
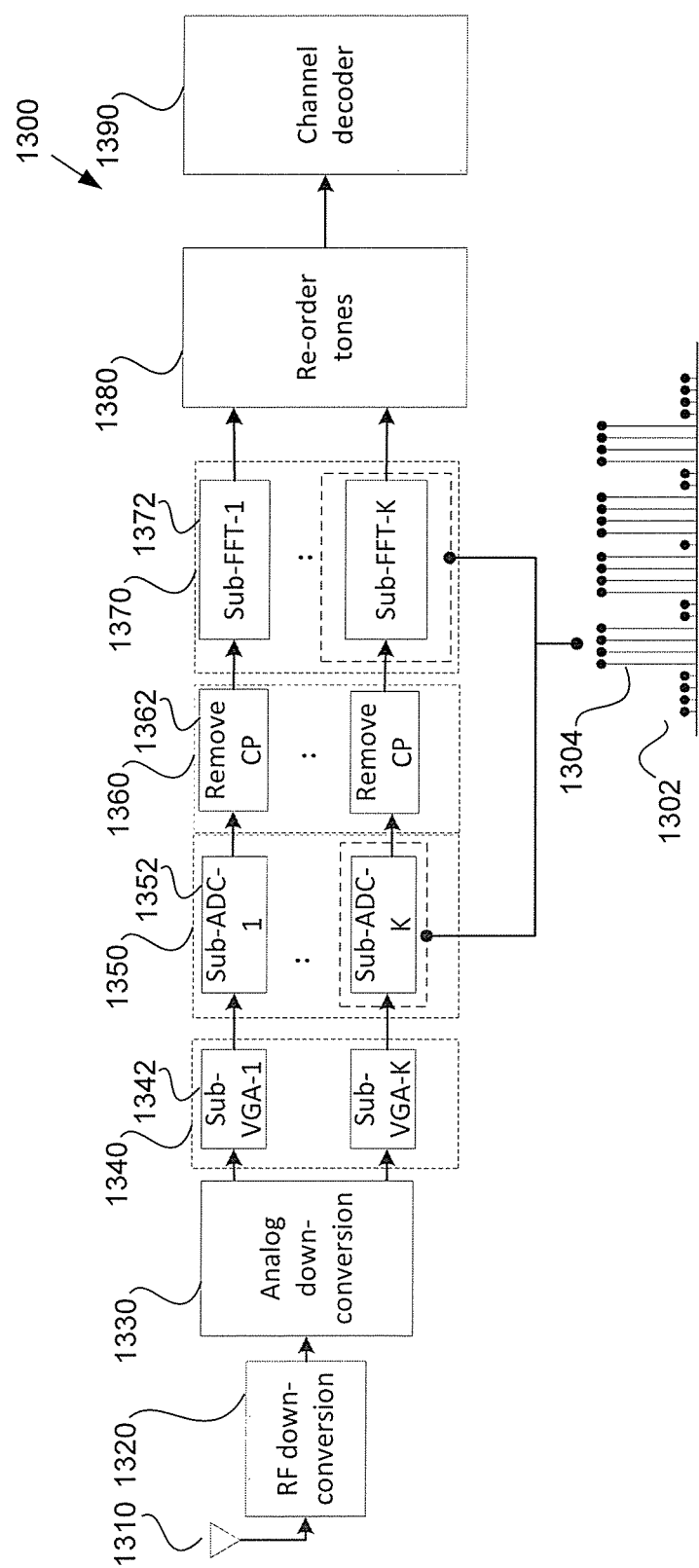
FIG. 13 shows another embodiment of a receiver architecture with multiple FFTs in accordance with an embodiment of this disclosure.

FIG. 13 shows another embodiment of a receiver architecture 1300 with multiple FFTs that does not require the wide bandwidth signal to be grouped together for up conversion and continues the processing at baseband. This eliminates the need for up conversion and taking a large FFT. In this case, each sub-ADC output at the baseband is directly converted to the frequency domain using multiple sub-FFTs. Since all the tones are now at the baseband, the tones need to be re-ordered in the correct transmission order before being sent to the channel decoder.

FIG. 13 shows the architecture of an example interleaved guard OFDM receiver architecture 1300 for multiple FFTs in accordance with disclosed embodiments. FIG. 13 illustrates a receiver operation using interleaved guard OFDM and sub-ADC processing. The wideband analog signal 1302 is received at 1310 and is down converted into multiple sub-bands at 1320, such as by an RF down-converter of the receiver. The receiver then uses an analog down-converter to convert to a baseband with multiple sub-bands at 1330, for example, by using mixers with multiple local oscillator (LO) frequencies followed by low pass filters (LPF) that filter out the harmonics and images to extract sub-bands. Due to non-ideal mixers and filters, there may be interference between the sub-bands during the up-conversion and down-conversion process at the receiver. This is where the interleaved guard tones as disclosed herein are placed in order to mitigate the interference at those transition regions.

The down-converted signal is passed through a wideband variable-gain amplifier (VGA) at 1340. As part of this process, each sub-band can be sent through an independent sub-VGA as illustrated at 1342. Each of the sub-bands 1304 of the interleaved-guard-tone band 1302 can be processed by a separate sub-VGA and sub-ADC.

The output of the wideband VGA is passed through a wideband ADC at 1350. As part of this process, each sub-band can sent through an independent sub-ADC 1352 and the outputs of each sub-ADC up-converted back to the digital domain. The output of the sub-ADC is finally up converted back in the digital domain. Each sub-ADC can have its own sub-VGA as shown at 1342. This allows each sub-ADC to have different gain compensation to combat frequency selective fading (or in-band low bandwidth interference, for example) and can thus reduce ADC bit-width requirements as well.

After conversion back to the digital domain, the receiver removes the CP from each sub-signal at 1360, in some cases using multiple sub-processes 1362, and the signal is fed into the FFT at 1370. In this example each digital sub-signal is processed using a separate sub-FFT 1372.

The receiver re-orders the tones of the sub-signals at 1380, and the converted signal is passed to a channel decoder at 1390.

Figure 14:
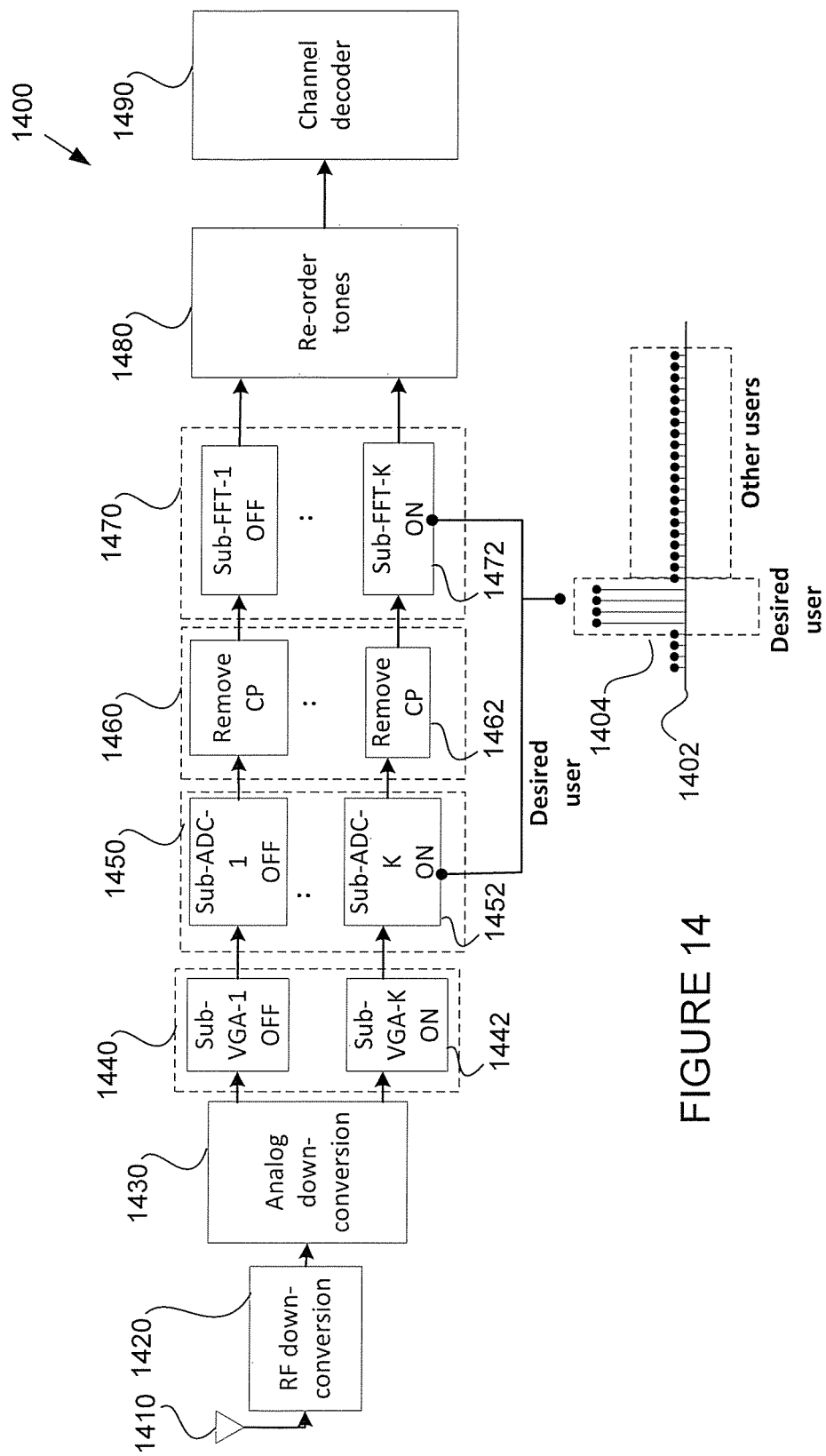
FIG. 14 shows an embodiment the disclosed techniques as applied to an OFDMA system in accordance with an embodiment of this disclosure.

FIG. 14 shows an embodiment the disclosed techniques as applied to an OFDMA system. The user data are transmitted in separate sub-bands based on ADC capabilities. The lower bandwidth can be used to support control channels for the current user for example where the data rate requirements are not high. That is, in various embodiments, the UE can receive and process data on one of a plurality of independently-decodable sub-bands associated with the UE using at least one sub-ADC, and can turn off at least one other sub-ADC corresponding to an independently-decodable sub-band not associated with or corresponding to that UE. The UE or other receiver can turn off the sub-VGAs, sub-ADCs and sub-FFTs belonging to all other users except the targeted user's resource. As is clear to a reader skilled in the art, this leads to increased power efficiency. Switching off pieces of logic is performed on a dynamic basis in accordance with the user bandwidth, scheduling and data rate requirements.

FIG. 14 shows another embodiment of a receiver architecture 1400. FIG. 14 shows the architecture of an example interleaved guard OFDM receiver architecture 1400 for multiple FFTs in accordance with disclosed embodiments that can process selected users and also turn off sub-processing paths (sub-ADCs, sub-VGAs and sub-FFTs) for other users (sub-bands that do not correspond to the particular receiver). Turning off sub-ADCs, sub-VGAs, sub-FFTs belonging to other users saves power. FIG. 14 illustrates a receiver operation using interleaved guard OFDM and sub-ADC processing. The wideband analog signal 1402 is received at 1410 and is down converted into multiple sub-bands at 1420, such as by an RF down-converter of the receiver. The receiver then uses an analog down-converter to convert to a baseband with multiple sub-bands at 1430, for example, by using mixers with multiple LO frequencies followed by LPFs that filter out the harmonics and images to extract sub-bands. Due to non-ideal mixers and filters, there may be interference between the sub-bands during the up-conversion and down-conversion process at the receiver. This is where the interleaved guard tones as disclosed herein are placed in order to mitigate the interference at those transition regions. The receiver can use the guard tones distributed within an OFDM symbol of the received waveform to filter the independently-decodable sub-bands.

The down-converted signal is passed through a wideband variable-gain amplifier (VGA) at 1440. As part of this process, each sub-band can be sent through an independent sub-VGA as illustrated at 1442. Each of the sub-bands 1404 of the interleaved-guard-tone band 1302 can be processed by a separate sub-VGA and sub-ADC. In this example, only the sub-band 1404 for a specific user is desired, which is processed by sub-VGA 1442. Only sub-VGA 1442 is turned on; all other sub-VGAs of 1440 are turned off. In this way, the receiver can receive and process data on one of a plurality of independently-decodable sub-bands associated with the UE using at least one sub-analog-to-digital converter (sub-ADC), and turn off at least one other sub-analog-to-digital converter corresponding to an independently-decodable sub-band not associated with that receiver The output of the wideband VGA is passed through a wideband ADC at 1450. As part of this process, each sub-band can sent through an independent sub-ADC 1452 and the outputs of each sub-ADC up-converted back to the digital domain. The output of the sub-ADC is finally up converted back in the digital domain. Each sub-ADC can have its own sub-VGA as shown at 1442. This allows each sub-ADC to have different gain compensation to combat frequency selective fading (or in-band low bandwidth interference, for example) and can thus reduce ADC bit-width requirements as well. In this example, only the sub-band 1404 for a specific user is desired, which is processed by sub-ADC 1452. Only sub-ACD 1452 is turned on; all other sub-ADCs of 1450 are turned off. That is, the receiver can process multiple independently decodable sub-bands using, for each sub-band, a separate variable gain amplifier (sub-VGA), analog-to-digital converter (sub-ADC), and Fast Fourier Transform (sub-FFT) processor.

After conversion back to the digital domain, the receiver removes the CP from each sub-signal at 1460, in some cases using multiple sub-processes 1462. As in other processes, the receiver can perform the CP removal at 1462 for only the sub-band for the desired user.

The signal is fed into the FFT at 1470. In this example each digital sub-signal can processed using a separate sub-FFT 1472, and only sub-FFT for the desired user is turned on while other sub-FFTs are turned off.

The receiver re-orders the tones of the sub-signals at 1480, and the converted signal is passed to a channel decoder at 1490.

In general, a receiver in a UE or other device can include a transceiver that is configured to communicate with a base station by transmitting capability information to the base station that includes at least one of the sub-band bandwidth or number of independently decodable sub-bands that can be dynamically turned on or off by the UE to save power, and thereafter communicate with the base station using a received waveform that is shaped according to an IG-OFDM structure defined at least in part by the capability information, where the IG-OFDM structure including guard tones distributed within an OFDM symbol where there is no signal transmission on these guard tones.

Figure 15:
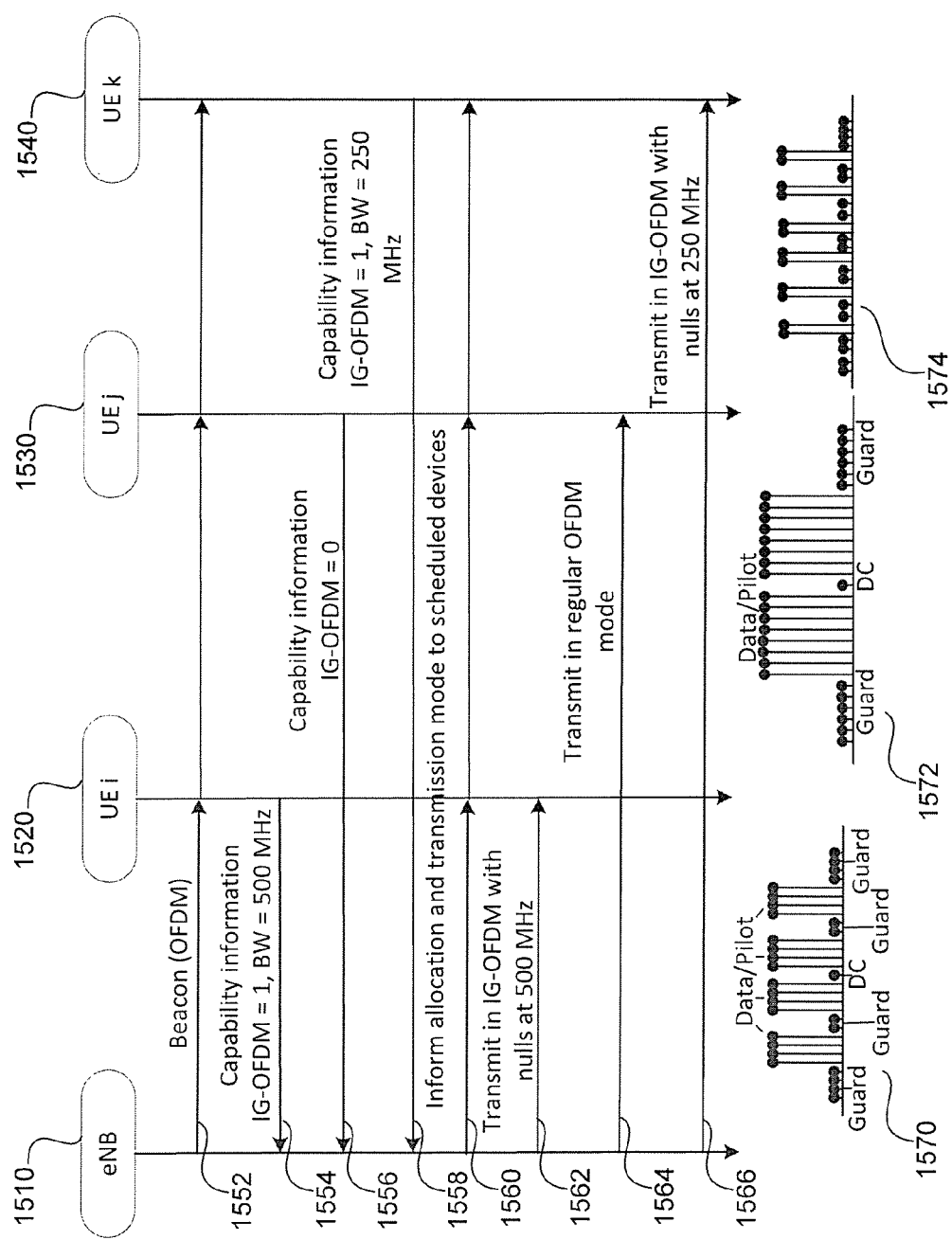
FIG. 15 illustrates dynamic interleaved-guard OFDM at the MAC layer in accordance with an embodiment of this disclosure.

According to various embodiments, a media access control (MAC) message can be used for configuration of OFDM structure. FIG. 15 illustrates dynamic interleaved-guard OFDM (IG-OFDM) at the MAC layer. The devices tell the AP whether they use sub-ADCs and if so, the supported bandwidths for the sub-ADC operation are reported to the eNB 1510. A person skilled in the art can understand that the eNB can be another device, and the invention can be applied to it without any loss of generality. The capability exchange can be performed by means of the capabilities IE, for instance. The eNB 1510 ensures that the device or group of devices (if MU-MIMO or OFDMA) can support the IG-OFDM mode and then decides to change the interleaving of the guard tones. The beacons can still be sent in regular OFDM mode for new devices to associate. The foregoing embodiment provides a basis for ensuring backward compatibility. This is shown in FIG. 15 as an illustration. UEs i 1520, j 1530, and k 1540 associate with the eNB 1510 and provide their capability information and their sub-ADC bandwidth, if applicable. Capability information can include, for example, an indication that the UE is IG-OFDM capable, one or more bandwidths that the UE is capable of decoding independently, the UE's sub-ADC sampling frequency, a bitmap of tones for an IG-OFDM structure that the UE prefers or is capable of decoding, an identification of spur locations or other locations within the band in which guard or null tones should be inserted, the specific sub-bands or set of pilot/data tones that will be decoded by the UE, sub-band bandwidth of the UE, the number of independently decodable sub-bands that can be dynamically turned on or off by the at least one UE to save power, or other information. The capability information defines the communication capability of the UE.

The eNB 1510 uses this information, schedules the devices in specific service periods, letting them know that future transmissions will be sent in this mode and transmits in IG-OFDM mode with the null tones placed in appropriate locations for power savings at the receiver. In some cases, the capability information includes or is transmitted using a bitmap of tones for the IG-OFDM structure, where the bit-map indicates locations where the guard or null tones should be inserted, and the IG-OFDM structure includes guard tones or null tones at those locations.

At 1552, the eNB 1510 broadcasts an OFDM beacon or other known reference signal to the UEs i 1520, j 1530, and k 1540.

At 1554, UE i 1520 responds with its capability information, in this case that it is IG-OFDM capable (IG-OFDM=1) and that its bandwidth is 500 MHz.

At 1556, UE j 1530 responds with its capability information, in this case that it is not IG-OFDM capable (IG-OFDM=0).

At 1558, UE k 1540 responds with its capability information, in this case that it is IG-OFDM capable (IG-OFDM=1) and that its bandwidth is 250 MHz.

At 1560, eNB 1510 sends allocation and transmission mode data to scheduled devices UEs i 1520, j 1530, and k 1540. Thereafter, eNB communates with each UE according to its respective capability information. The eNB's controller can dynamically customize the IG-OFDM structure used for communication with each of the UEs according to the respective capability information. The eNB's controller can define an IG-OFDM structure according to the received capability information, where the IG-OFDM structure includes guard tones distributed within an OFDM symbol where there is no signal transmission on these guard tones.

The eNB can then communicate with the UEs using a transmitted waveform that is shaped according to the IG-OFDM structure, or without using IG-OFDM for UEs that do not support it. For example, the eNB can dynamically switch between an IG-OFDM mode and a non-IG-OFDM mode to communicate with the one UE according to the IG-OFDM structure in an IG-OFDM service period, and to also communicate with a second UE in a second service period without using an IG-OFDM structure.

At 1562, eNB communicates with UE i 1520 in IG-OFDM with nulls at 500 MHz, in accordance with that UE's capability information, as illustrated at 1570.

At 1564, eNB communicates with UE j 1530 in standard OFDM (or other non-IG-OFDM protocol), in accordance with that UE's capability information, as illustrated at 1572.

At 1566, eNB communicates with UE k 1540 in IG-OFDM with nulls at 250 MHz, in accordance with that UE's capability information, as illustrated at 1574. As shown, the eNB can communicate with different UEs using different respective sub-band bandwidths according to the IG-OFDM structure.

According to other disclosed embodiments, the devices can be configured dynamically on the PHY layer. Reserved bits in the PHY header or extended PHY headers, in the current specification, can be used for the purpose of signaling. This can allow changes on a per-packet basis if needed.

To maintain backward compatibility, the header can be sent in regular OFDM mode so that all devices can detect the header. For example, the capability information as described herein can be communicated in a portion of a data packet, such as a header, and another portion of the data packet is then formatted according to the IG-OFDM structure that is defined according to the capability information. More generally, the capability information or IG-OFDM structure can be communicated in a first portion of a data transmission, and a second portion of the data transmission is formatted according to the IG-OFDM structure (directly or as defined according to the capability information). In this way, the packet or transmission itself can define the IG-OFDM structure of its own body.

Figure 16:
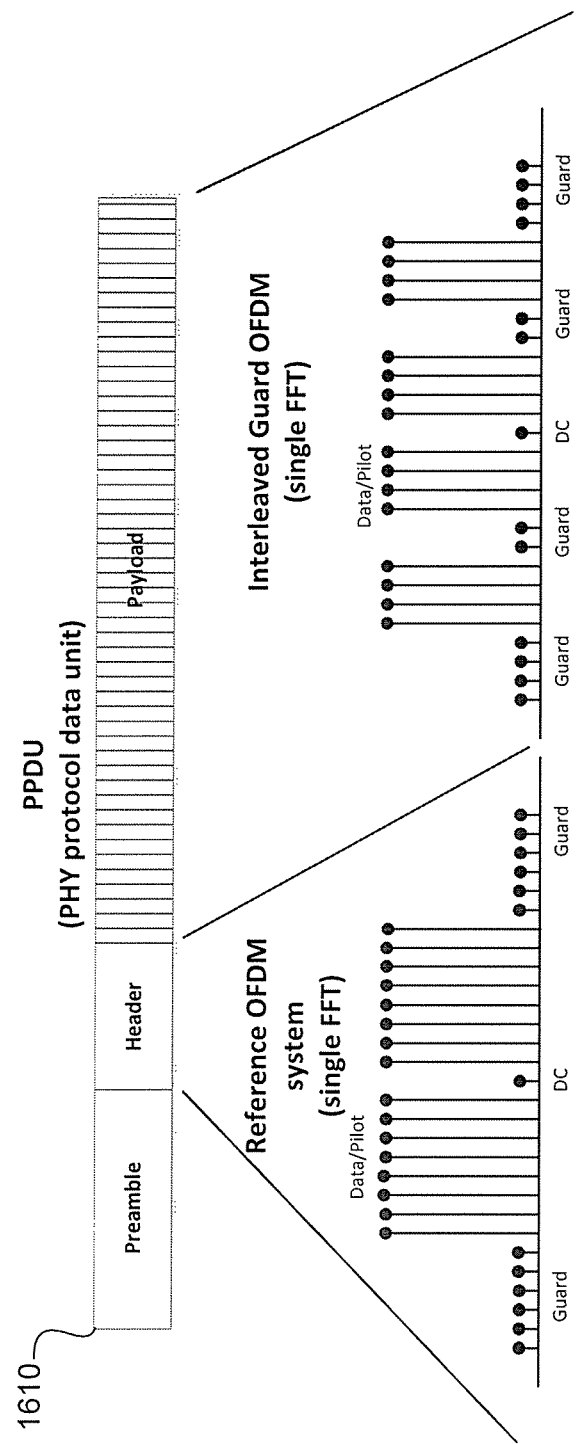
FIG. 16 illustrates dynamic configuration on the PHY layer, where the IG-OFDM mode is changed dynamically between the header and the payload in accordance with an embodiment of this disclosure.

FIG. 16 illustrates dynamic configuration on the PHY layer, where the IG-OFDM mode is changed dynamically between the header and the payload. Shown here is a PHY protocol data unit (PPDU) 1610 that has a preamble, a header, and a payload. In this example, the header defines a reference OFDM system with a single FFT. The payload defines the IG-OFDM system with a single FFT.

In various embodiments, the location of interleaved guards can also be programmable. In this way, the system can optimize the IG-OFDM mode based on receiver capabilities. The receiver informs AP via the capabilities IE of the sub-ADC bandwidths it can support.

In various embodiments, the eNB can dynamically switch between regular and IG-OFDM modes of operation. The eNB can provide scheduled modes of operation in its service period (for example, in IEEE 802.11ad). A special period for IG-OFDM operation can be created (called IG-OFDM Service period). In an IG-OFDM service periods, devices that have performed capability exchange and indicated IG-OFDM support can be handled in that period by the eNB. In this period, the eNB and devices can communicate using IG-OFDM to save power at the receiver. This can be fully transparent to the existing devices who will be handled in the normal service period and the eNB can transmit in a conventional OFDM mode in this service period.

Figure 17:
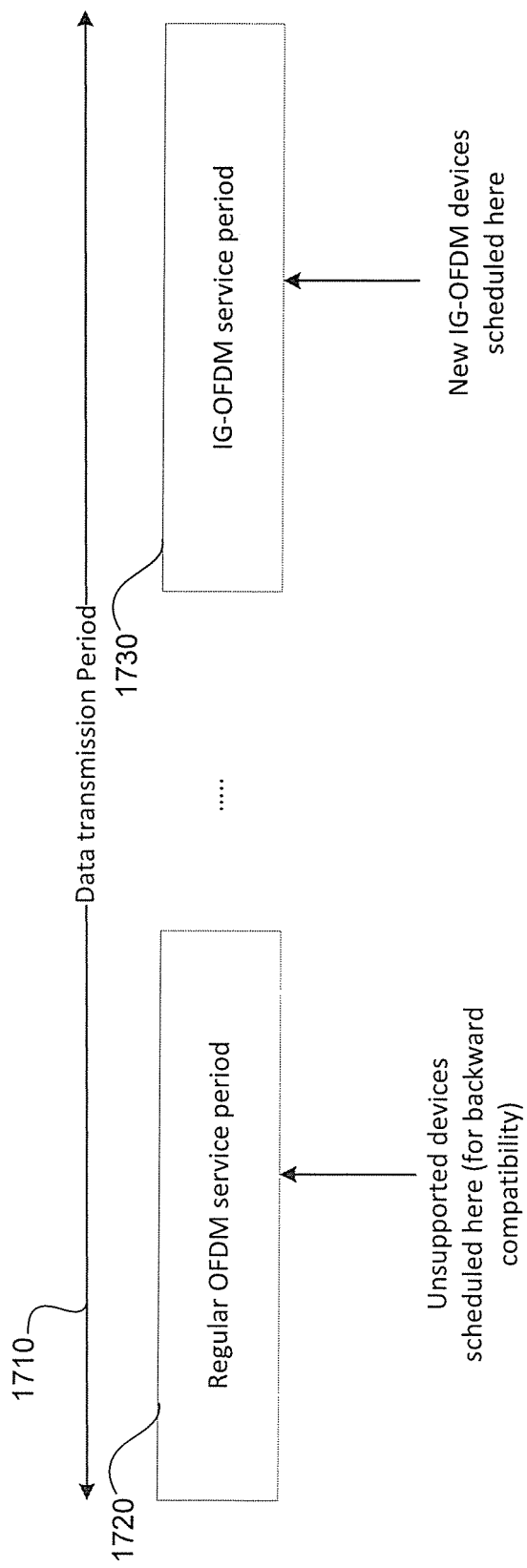
FIG. 17 illustrates dynamic switching and scheduling between OFDM and IG-OFDM transmission modes in accordance with an embodiment of this disclosure.

FIG. 17 illustrates dynamic switching and scheduling between OFDM and IG-OFDM transmission modes. During the full transmission period 1710, the system schedules a regular OFM service period 1720, and at a different time, schedules an IG-OFDM service period 1730. Corresponding UEs are scheduled for communication at during the respective service periods.

In various embodiments, the IG-OFDM structure can be used for support of small packets (such as for devices supporting Internet of Things (IoT)), which can use reduced spectrum and do not require high data rates. A low bandwidth device for IoT can have a flexible front-end but yet use a reduced bandwidth architecture for processing. The allocation for the low bandwidth is communicated in advance by the MAC to device. This could be done via signaling in a pre-determined low bandwidth for greenfield devices. This signaling could be done in a manner similar to modes used in cellular systems to support minimum bandwidth devices but allowing support of the IG-OFDM structure at the transmitter for communication.

Figure 18:
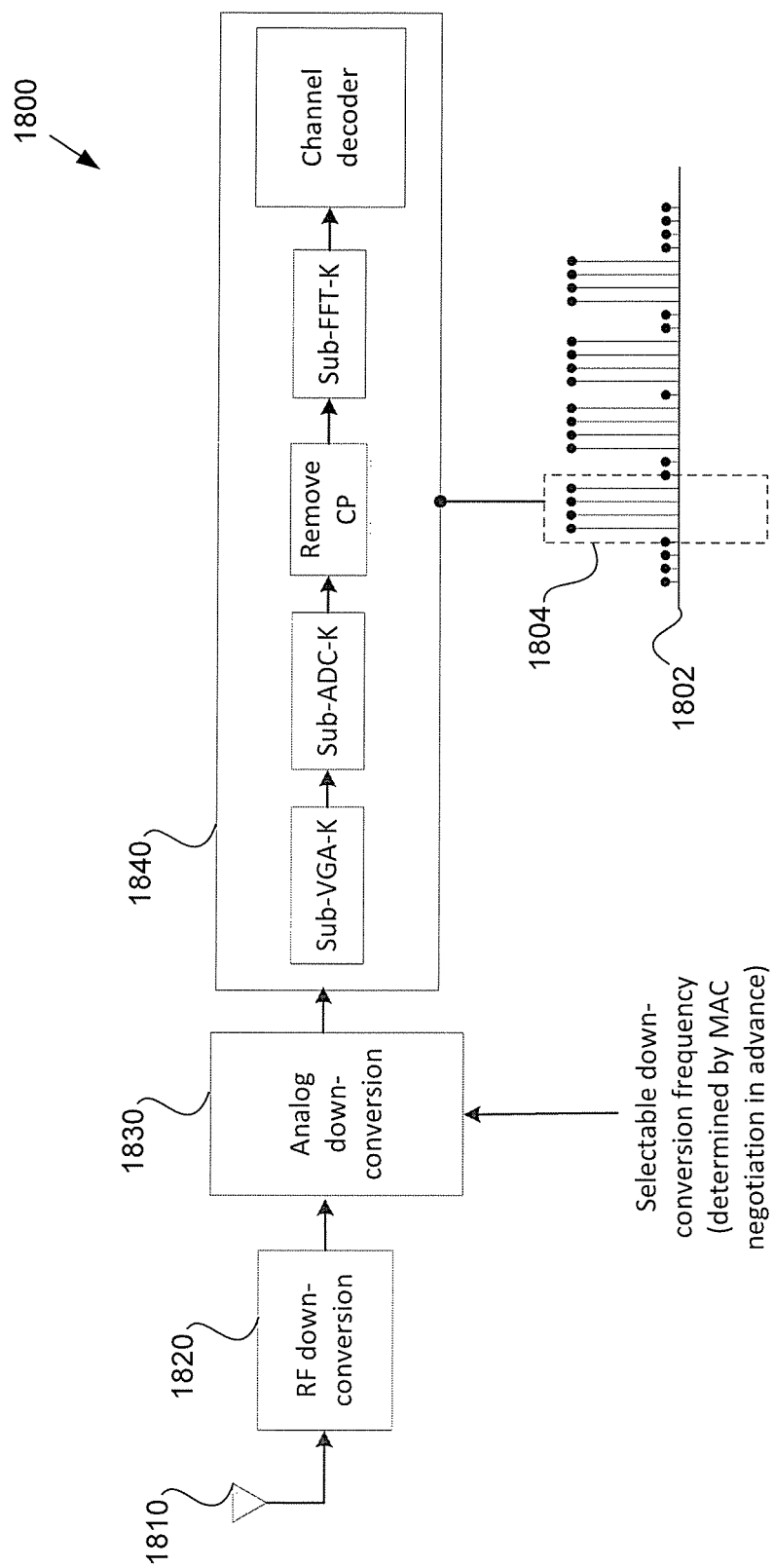
FIG. 18 illustrates an example of where a low-bandwidth device supports only a single sub-ADC and sub-FFT for operation in accordance with an embodiment of this disclosure.

FIG. 18 illustrates an example of where a low-bandwidth device 1800 supports only a single sub-ADC and sub-FFT for operation. In this example, receiver 1800 receives the full-bandwidth OFDM signal 1802 at 1810 and performs RF down-conversion as described herein at 1820. During analog down-conversion at 1830, the received 1800 uses a selectable down-conversion frequency as previously defined by MAC negotiation. This produces a down-converted signal corresponding only to sub-band 1804 in this example.

Further processing at 1830 is then performed only on sub-band 1804 using a single sub-VGA, sub-ADC, and sub-FFT.

Various embodiments also provide that the sub-band processing at the receiver can be done by moving the sub-band to half its bandwidth (or close to half) instead of moving the sub-band to DC. Such embodiments perform sub-band processing with twice the sub-ADC bandwidth but with half the number of sub-ADCs. In particular, I and Q does not require separate ADCs in this method and can be down-converted digitally. The advantage of this approach is that it eliminates the need for additional DC tones for sub-bands, thereby improving spectral efficiency.

Figure 19:
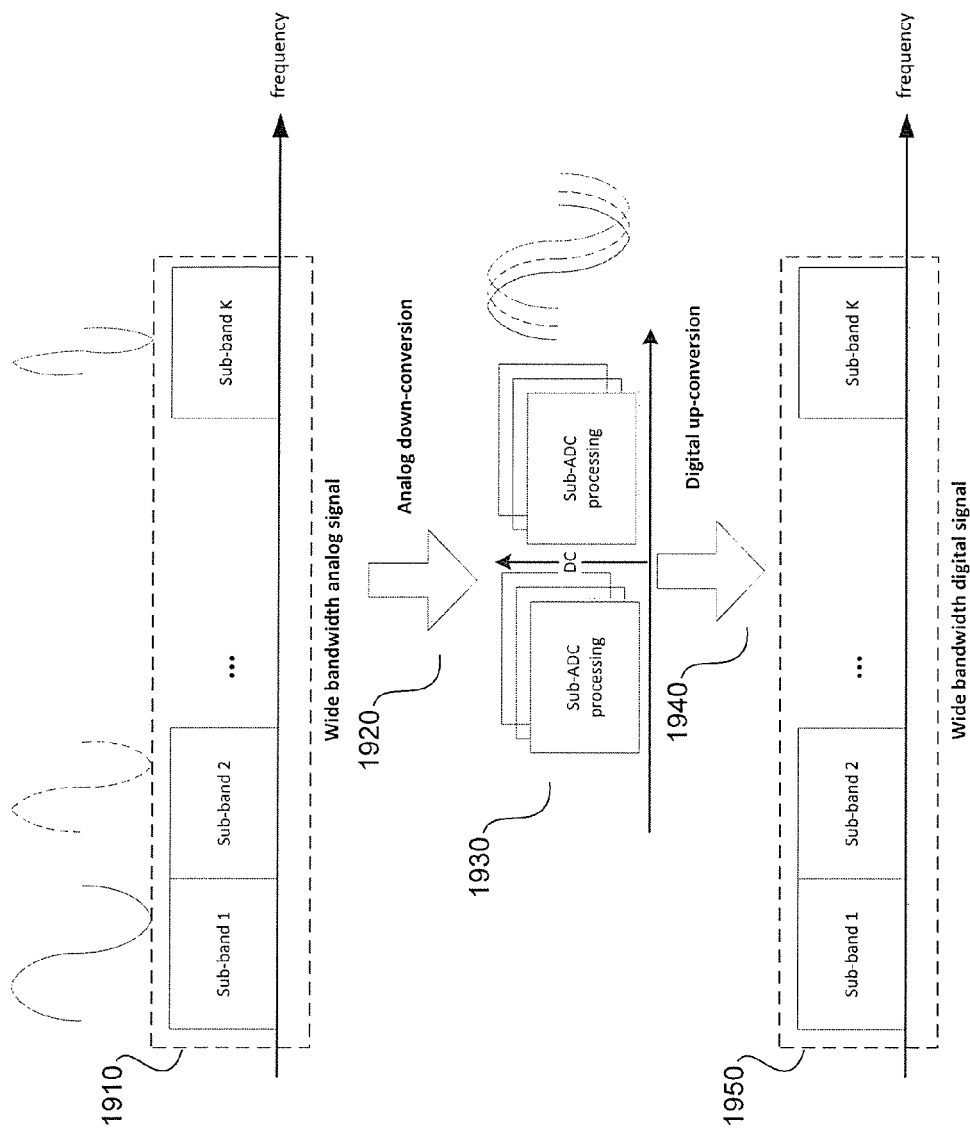
FIG. 19 illustrates such an alternate receiver architecture with down conversion to half bandwidth instead of DC in accordance with an embodiment of this disclosure.

FIG. 19 illustrates such an alternate receiver architecture with down conversion to half bandwidth instead of DC. The receiver receives a wide-bandwidth analog signal 1920. The receiver performs analog down-conversion at 1920 to half bandwidth instead of DC, producing two sub-bands. The two sub-bands are processed as described herein using sub-ADC processing for each sub-band at 1930. The receiver performs digital up-conversion on the digital sub-bands to produce the wide-bandwidth digital signal 1950.

Various disclosed embodiments include an OFDM structure for large bandwidth systems where the guard/null tones are distributed (interleaved) within the OFDM symbol. Various embodiments include a transmitter architecture with IG-OFDM that allows multiple receiver implementations with sub-band processing, a transmitter architecture with guard/null tones placed at locations aligned with the receiver sub-ADC bandwidth, and a transmitter architecture with guard/null tones placed at the DC of the receiver sub-ADC bandwidth. Various disclosed embodiments include a low-power receiver architecture that uses sub-ADCs with bandwidth aligned to the guard/null tone distribution and a low power receiver architecture using sub-ADCs and multiple sub-FFTs with bandwidth aligned to guard/null tone distribution. Various disclosed embodiments include a system using OFDMA where users are assigned to different sub-bands and the receiver can turn off sub-bands (sub-VGA, sub-ADC, sub-FFT for example) assigned for other users to save power, and a system using the capabilities IE to exchange knowledge of IG OFDM mode support at the receiver and the sub-ADC bandwidths supported. Disclosed embodiments also includes a MAC message to configure the receiver in IG OFDM mode dynamically on a packet basis, and a PHY reserved header bit to configure the receiver in IG OFDM mode dynamically between header and payload on a symbol basis. Various embodiments include a transmitter that can dynamically program the IG OFDM guard tone locations based on receiver requirements on a packet basis, the allocation of service periods for IG-OFDM and regular OFDM operation, and support for a low bandwidth receiver architecture that uses a single sub-ADC and sub-FFT with a configurable front-end using IG-OFDM as disclosed herein.

The following documents and standards descriptions are hereby incorporated into the present disclosure as if fully set forth herein:

[1] IEEE Std 802.11ad™-2012, "Part 11: Wireless LAN Medium Access Control (MAC) and Physical Layer (PHY) Specifications—Amendment 3: Enhancements for Very High Throughput in the 60 GHz Band," December 2012

[2] IEEE Std 802.11ac™-2013, "—Part 11: Wireless LAN Medium Access Control (MAC) and Physical Layer (PHY) Specifications—Amendment 4: Enhancements for Very High Throughput for Operation in Bands below 6 GHz," December 2013

[3] 3GPP, TR 36.808 Evolved Universal Terrestrial Radio Access (E-UTRA); Carrier Aggregation; Base Station (BS) radio transmission and reception

[4] H. Zhang, S. Venkateswaran, U. Madhow, "Analog multitone with interference suppression: Relieving the ADC bottleneck for wideband 60 GHz systems," IEEE Global Communications Conference (Globecom), pp. 2305-2310, December 2012

[5] Multi-band OFDM physical layer specification v1.5, see: http://www.wimedia.org/en/docs/10003r02WM_CRB-WiMedia_PHY_Spec_1.5.pdf Although the present disclosure has been described with an exemplary embodiment, various changes and modifications may be suggested to one skilled in the art. It is intended that the present disclosure encompass such changes and modifications as fall within the scope of the appended claims. None of the description in the present application should be read as implying that any particular element, step, or function is an essential element which must be included in the claim scope: the scope of patented subject matter is defined only by the allowed claims. Moreover, none of these claims are intended to invoke 35 USC §112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. §112(f).

What is claimed is:

1. An apparatus, comprising:
 a transceiver configured to:
  transmit a known reference signal; and
  receive, in response to the reference signal and from at least one user equipment (UE), capability information that includes at least one of a sub-band bandwidth or number of independently decodable sub-bands that can be dynamically turned on or off by the at least one UE; and
 at least one processor operably connected to the transceiver, the at least one processor configured to define an interleaved guard OFDM (IG-OFDM) structure according to the received capability information, the IG-OFDM structure including guard tones distributed within an OFDM symbol where there is no signal transmission on these guard tones; and
 wherein the transceiver is further configured to communicate with the at least one UE using a transmitted waveform that is shaped according to the IG-OFDM structure.

2. The apparatus of claim 1, wherein the capability information is transmitted using a bitmap of tones for the IG-OFDM structure, where the bit-map indicates locations where the guard or null tones should be inserted, and the IG-OFDM structure includes guard tones or null tones at those locations.

3. The apparatus of claim 1, wherein the apparatus dynamically switches between an IG-OFDM mode and a non-IG-OFDM mode to communicate with the at least one UE according to the IG-OFDM structure in an IG-OFDM service period, and to also communicate with a second UE in a second service period without using an IG-OFDM structure.

4. The apparatus of claim 1, wherein the IG-OFDM structure is communicated in a first portion of a data transmission, and a second portion of the data transmission is formatted according to the IG-OFDM structure.

5. The apparatus of claim 1, wherein the apparatus communicates with at least two different UEs using different respective sub-band bandwidths according to the IG-OFDM structure.

6. A user equipment (UE) for wireless communication with at least one base station comprising:
   at least one processor; and
   a transceiver operably connected to the at least one processor, the transceiver configured to:
      communicate with the at least one base station by transmitting capability information to the at least one base station that includes at least one of a sub-band bandwidth or number of independently decodable sub-bands that can be dynamically turned on or off by the UE; and
      thereafter communicate with the base station using a received waveform that is shaped according to an interleaved guard OFDM (IG-OFDM) structure defined at least in part by the capability information, the IG-OFDM structure including guard tones distributed within an OFDM symbol where there is no signal transmission on these guard tones.

7. The UE of claim 6, wherein the capability information is communicated in a first portion of a data transmission, and a second portion of the data transmission is formatted according to the IG-OFDM structure.

8. The UE of claim 6, wherein the UE uses the guard tones distributed within an OFDM symbol of the received waveform to filter at least one of the independently-decodable sub-bands.

9. The UE of claim 6, wherein the UE processes multiple independently decodable sub-bands using, for each sub-band, a separate variable gain amplifier (sub-VGA), analog-to-digital converter (sub-ADC), and Fast Fourier Transform (sub-FFT) processor.

10. The UE of claim 6, wherein the UE dynamically turns off sub-processing paths for sub-bands that do not correspond to that UE.

11. The UE of claim 6, wherein the UE receives and processes data on at least one of a plurality of independently-decodable sub-bands associated with the UE using at least one sub-analog-to-digital converter (sub-ADC), and turns off at least one other sub-analog-to-digital converter corresponding to an independently-decodable sub-band not associated with the UE.

12. A method for wireless communication by an apparatus in a user equipment (UE) having at least a transceiver that includes at least a controller, the method comprising:
   communicating with at least one base station by transmitting capability information to the at least one base station that includes at least one of a sub-band bandwidth or number of independently decodable sub-bands that can be dynamically turned on or off by the UE; and
   thereafter communicating with the base station using a received waveform that is shaped according to an interleaved guard OFDM (IG-OFDM) structure defined at least in part by the capability information, the IG-OFDM structure including guard tones distributed within an OFDM symbol where there is no signal transmission on these guard tones.

13. The method of claim 12, wherein the capability information includes a bitmap of tones for the IG-OFDM structure, wherein the bit-map indicates locations where the guard tones or null tones should be inserted, and the IG-OFDM structure includes the guard tones or the null tones at those locations.

14. The method of claim 12, further comprising filtering at least one of the independently-decodable sub-bands using the guard tones distributed within an OFDM symbol of the received waveform.

15. The method of claim 12, further comprising receiving and processing data on one of a plurality of independently-decodable sub-bands associated with the apparatus using at least one sub-analog-to-digital converter (sub-ADC), and turning off at least one other sub-analog-to-digital converter corresponding to an independently-decodable sub-band not associated with the apparatus.

16. The method of claim 12, wherein the capability information is transmitted in a first portion of a data transmission, and a second portion of the data transmission is formatted according to the IG-OFDM structure.

17. The method of claim 12, wherein the at least one base station communicates with at least two different UEs using different respective sub-band bandwidths according to the IG-OFDM structure.

18. The method of claim 12, further comprising processing multiple independently decodable sub-bands using, for each sub-band, a separate variable gain amplifier (sub-VGA), analog-to-digital converter (sub-ADC), and Fast Fourier Transform (sub-FFT) processor.

19. The method of claim 12, further comprising dynamically turning off sub-processing paths for sub-bands that do not correspond to that apparatus.

20. The method of claim 12, wherein the guard tones are distributed within an OFDM symbol at specific locations to reduce interference between sub-bands.

* * * * *